(12) United States Patent
Enga

(10) Patent No.: US 11,341,202 B2
(45) Date of Patent: May 24, 2022

(54) EFFICIENT METHOD OF LOCATION-BASED CONTENT MANAGEMENT AND DELIVERY

(75) Inventor: David Enga, Fairfax, VA (US)

(73) Assignee: Craxel, Inc., Chantilly, VA (US)

( * ) Notice: Subject to any disclaimer, the term of this patent is extended or adjusted under 35 U.S.C. 154(b) by 1505 days.

(21) Appl. No.: 11/905,810

(22) Filed: Oct. 4, 2007

(65) Prior Publication Data

US 2008/0086464 A1 Apr. 10, 2008

Related U.S. Application Data

(60) Provisional application No. 60/849,082, filed on Oct. 4, 2006.

(51) Int. Cl.
*G06F 16/9537* (2019.01)
*G06F 16/29* (2019.01)

(52) U.S. Cl.
CPC .......... *G06F 16/9537* (2019.01); *G06F 16/29* (2019.01)

(58) Field of Classification Search
CPC .......... G06F 17/3087; G06F 17/30241; G06F 16/9537; G06F 16/29
USPC ....................................................... 707/724
See application file for complete search history.

(56) References Cited

U.S. PATENT DOCUMENTS

| | | | |
|---|---|---|---|
| 6,223,182 B1 * | 4/2001 | Agarwal | G06F 17/30595 |
| 6,252,547 B1 | 6/2001 | Perry et al. | |
| 6,401,029 B1 | 6/2002 | Kubota et al. | |
| 6,542,819 B1 * | 4/2003 | Kovacs et al. | 701/408 |
| 6,954,697 B1 | 10/2005 | Smith | |
| 7,720,436 B2 * | 5/2010 | Hamynen et al. | 455/13.1 |
| 2001/0045965 A1 * | 11/2001 | Orbanes et al. | 345/841 |
| 2002/0055924 A1 * | 5/2002 | Liming | 707/100 |
| 2002/0115453 A1 * | 8/2002 | Poulin et al. | 455/456 |
| 2002/0160766 A1 * | 10/2002 | Portman et al. | 455/422 |
| 2002/0161627 A1 * | 10/2002 | Gailey et al. | 705/10 |
| 2002/0161647 A1 * | 10/2002 | Gailey et al. | 705/14 |
| 2002/0184200 A1 * | 12/2002 | Ueda et al. | 707/3 |
| 2003/0036848 A1 | 2/2003 | Sheha et al. | |
| 2003/0220835 A1 * | 11/2003 | Barnes, Jr. | 705/14 |
| 2004/0019581 A1 * | 1/2004 | Davis et al. | 707/1 |
| 2004/0230467 A9 * | 11/2004 | Gailey et al. | 705/10 |
| 2005/0015307 A1 * | 1/2005 | Simpson et al. | 705/26 |
| 2005/0030194 A1 * | 2/2005 | Cheng et al. | 340/825.49 |
| 2006/0149774 A1 * | 7/2006 | Egnor | G06F 17/3087 |
| 2006/0188327 A1 * | 8/2006 | Moon | 403/325 |

(Continued)

OTHER PUBLICATIONS

Alexander Szalay, Indexing the Sphere, Aug. 2005.*

*Primary Examiner* — James Trujillo
*Assistant Examiner* — Kurt A Mueller
(74) *Attorney, Agent, or Firm* — Culhane Meadows, PLLC

(57) ABSTRACT

A program storing computer-readable instructions therein for instructing a computer to perform analytical steps for generating a spatial hierarchy identifier that corresponds to a spatial hierarchy used on a server, the program includes a recording medium readable by the computer; and the computer instructions stored on said recording medium instructing the computer to perform the processes including identifying a position using a position indication system, and generating an identifier within the computer and independent of the server, wherein the identifier identifies first regions within the first spatial hierarchy on the server corresponding to the position.

18 Claims, 14 Drawing Sheets

(56) References Cited

U.S. PATENT DOCUMENTS

| | | | |
|---|---|---|---|
| 2006/0265197 A1* | 11/2006 | Peterson | 703/2 |
| 2007/0016565 A1 | 1/2007 | Evans et al. | |
| 2007/0041336 A1* | 2/2007 | Wan et al. | 370/256 |
| 2007/0112808 A1* | 5/2007 | Howard et al. | 707/100 |
| 2007/0258623 A1 | 11/2007 | McGrath et al. | |
| 2008/0086464 A1* | 4/2008 | Enga | 707/4 |
| 2008/0126403 A1* | 5/2008 | Moon | 707/103 R |
| 2008/0183730 A1* | 7/2008 | Enga | 707/100 |
| 2009/0164459 A1* | 6/2009 | Jennings et al. | 707/5 |
| 2009/0192903 A1* | 7/2009 | Weiss et al. | 705/17 |
| 2009/0307067 A1* | 12/2009 | Obermeyer | 705/14.1 |
| 2010/0017261 A1* | 1/2010 | Evans et al. | 705/10 |
| 2010/0042519 A1* | 2/2010 | Dingler et al. | 705/30 |

* cited by examiner

EFFICIENT METHOD OF LOCATION-BASED CONTENT MANAGEMENT AND DELIVERY

This invention claims the benefit of U.S. Provisional Application No. 60/849,082 filed on Oct. 4, 2006, which is hereby incorporated by reference in its entirety.

BACKGROUND OF THE INVENTION

Field of the Invention

The embodiments of the invention relate to location-based content management, and more particularly, to an efficient method of provisioning and processing location-based content. Although embodiments of the invention are suitable for a wide scope of applications, it is particularly suitable for efficient management and delivery of a large amount of location-based content to many mobile devices and web browsers.

Discussion of the Related Art

In general, existing spatial data provisioning, processing and searching methods can not support a large data set and the high query rate required to support millions of mobile devices and/or web browsers. Modern search methods make use of indexing techniques to quickly find the data that most likely match the search criteria, while ignoring the data that can not be a match. Indexing spatial data effectively is even more important because spatial calculations are much slower due to their multidimensional nature. However, as the size of the data set indexed by a spatial index grows, the indexing techniques become less and less effective and the rate that searches can be performed is dramatically reduced. The two most common indexing techniques are R-trees and quad-trees.

R-trees split space with hierarchically nested, and possibly overlapping minimum bounding rectangles. The topology of an R-tree is dependent on data insertion order and is fit to the data. The R-tree becomes less effective as the amount of data held in an R-tree grows. The node in an R-tree that contains a location or area independent of the data-driven R-tree topology is impossible to determine. Determining which nodes in an R-tree intersect an area or point requires a recursive search of the R-tree that compares the minimum bounding areas for each child node and recursively searches the child nodes that intersect the minimum bounding area of the input area or point. Because R-trees are built from the bottom-up to fit the data, R-trees require complex splitting algorithms to maintain a balanced tree. The complex splitting algorithms and data-driven R-tree topology make R-trees very complex and difficult to implement.

Another common spatial indexing technique is the quad-tree. There are multiple forms of quad-tree, which use different methods of dividing space. One form of a quad-tree spatial index recursively divides space into rectangular tiles, while another form, called Hierarchical Triangular Mesh, divides space into spherical triangles. While quad-trees easily and efficiently index objects at a single point, quad-trees do not easily index objects with size and shape without limiting performance for larger data sets. As the data set stored in a quad-tree grows, there will likely be more and more objects that cross tile boundaries. One method of managing the problem of objects crossing tile boundaries is to break up the objects into multiple objects that fit into the tiles represented by leaf-nodes. Breaking up objects into multiple objects is very difficult to implement since the calculations involved in splitting geometric shapes are complex. Breaking up objects into multiple objects also creates a large number of objects stored in the leaf-nodes that must be evaluated during searches and other operations. A second method is to keep references to the objects in each tile that the object overlaps. This second method is also difficult to manage and causes too many objects to be evaluated during searches and other operations. An easier alternative method is to keep an object in the deepest node of the tree in which the object is fully contained. This alternative method leads to extremely simple algorithms for performing operations within the index.

Unfortunately, this alternative method creates major performance problems because an increasing number of objects end up closer to the root node of the tree as the size of the data set increases. Most of these objects are likely to be small objects that happen to be located on tile boundaries. Since search operations typically start at the root node and recursively search each child node that intersects the search window, nodes at the top of the tree are searched more often. Therefore, as more objects are located at the top of the tree, the performance of the index will decrease. All indexing methods that use a regular division of space, such as quad-trees, exhibit performance degradation when each of the objects is kept in the deepest node of the tree in which each of the objects is fully contained. Several attempts have been made to solve the quad-tree problem with limited success, including tiling space with oversized tiles. However, none of these methods have sufficiently solved the quad-tree scalability problem. The scalability problems of quad-trees are the reason that R-trees are the most commonly used spatial index, even though quad-tree indexes are much simpler to implement and manage.

Another attempt to increase the search rate for spatial data has been to replicate the spatial data indexes across multiple computers. Replicating a spatial database across two comparable computers will double the search rate. However, since all known spatial indexing techniques degrade as their data sets grow, doubling that degraded performance is of limited usefulness. Another attempt to increase the search rate for spatial data uses peer-to-peer technology to distribute the spatial data to multiple computers. In a peer-to-peer query, space is subdivided using a quad-tree subdivision method and the subdivisions that intersect the query window are identified. The center point of each subdivision is hashed using the Chord hashing method to identify the single peer-to-peer node that is assigned to that subdivision. Tree traversal is a sequence of peer visits. Messages are sent to each identified peer to request an operation, such as the query. However, since the Chord method uses a hashing function that can vary largely even for coordinate points that are close together, each peer can only be assigned specific nodes of a quad-tree, and not a section of the quad-tree with multiple nodes. A section of a quad-tree is any set of nodes that are connected in a graph with no cycles. Since quad-trees at a reasonable depth of fifteen can have over a billion nodes, and a given query window can cover a large number of them, a large number of peers would have to be visited, each requiring a message to be sent. The number of messages required is a performance bottleneck that significantly limits the effectiveness of distributing a spatial database over a peer-to-peer system. The workaround of greatly reducing the maximum depth of the tree to reduce the potential number of messages reduces the effectiveness of the underlying quad-tree index and limits the potential performance gains of the peer-to-peer method.

The peer-to-peer method suffers from the same problem as a regular quad-tree. Peers assigned to higher-level nodes will have more processing to perform as the data sets grow and more objects are located higher in the tree. These higher-level nodes will become bottlenecks. An optimization technique for such a peer-to-peer method is to only assign peers at a minimum level of the quad-tree, and not allow objects to be stored at higher levels. Only assigning peers at a minimum level of the quad-tree requires splitting those objects that would have been above the minimum level so that they fit within the tiles at the minimum level. Such splitting increases complexity dramatically and increases the number of objects that have to be evaluated during searches that intersect nodes that contain objects that have been split.

Another attempt to manage a large amount of spatial data is through distributing R-trees. These efforts also include distributing the M-tree and the MC-tree. Since R-trees topology is data-driven and not driven by a regular subdivision of space, R-trees rely on a single master node to supervise and direct queries to all other nodes in the system. A single master node is required because the nodes representing minimum bounding rectangles must be available in order to determine which leaf nodes a window query covers. The attempts to use R-trees, M-trees, and MC-trees as distributed trees, which distribute the leaf nodes to multiple machines, suffer the same problems as R-trees with respect to performance and manageability. As the data set grows, the distributed R-trees, M-trees, and MC-trees become less efficient. Minimum bounding rectangle comparisons are the same in distributed R-trees as non-distributed R-trees. Minimum bounding rectangle comparisons in distributed R-trees must take place in order to determine where the R-tree leaf nodes are located that intersect an area. Since each level of minimum bounding rectangle (MBR) is based on the data that is part of the MBR, any updates or changes may require a complex splitting process. For distributed R-trees, the splitting process becomes even more complicated as changes to lower level MBRs must be propagated up the tree.

Another attempt to increase the search rate on large amounts of data is to order the multidimensional data according to a space-filling curve and partition by the resulting one-dimensional order. A typical use of a space-filling curve is to generate a grid of like-sized rectangles at one level of a quad-tree subdivision, and then associate a one-dimensional identifier to each rectangle using the space-filling curve. However, the use of an identifier generated from a space-filling curve is only practical for points, and not objects with size and shape. Objects with size and shape would have to be decomposed into multiple objects, each of which fit within a rectangle. This decomposition is in practice unmanageable. If the grid is subdivided into too many rectangles, query performance is poor since all of the rectangles that intersect a query window must be evaluated. If the grid is not subdivided enough, then too many data items stored in too-few rectangles have to be evaluated anytime a query window intersects any portion of the rectangle. Any level of a recursive hierarchical subdivision can be represented by a space-filling curve, however the hierarchy of subdivisions is lost in this ordering when used to generate an identifier for a given subdivision. Therefore, it is impractical to determine which subdivisions in a hierarchy are related to a given subdivision with a given identifier generated from a space-filling curve.

SUMMARY OF THE INVENTION

Accordingly, embodiments of the invention are directed to an efficient method of managing and delivering location-based content to mobile devices and web browsers that substantially obviates one or more of the problems due to limitations and disadvantages of the related art.

An object of embodiments of the invention is to provide an improved way to associate information with physical locations or areas on a large scale and to provide a search method that improves the relevancy of information provided.

An object of embodiments of the invention is to support a large search rate from many mobile devices and web browsers over a large amount of spatial data.

Another object of embodiments of the invention is to provide an improved way to distribute a spatial hierarchy to multiple computing resources.

Another object of embodiments of the invention is to provide an improved way to map computing resources to sections of a spatial hierarchy.

Another object of embodiments of the invention is to provide a fast way to search a spatial hierarchy distributed over multiple computing resources.

Another object of embodiments of the invention is to provide a way to remove performance bottlenecks associated with specific sections in a spatial hierarchy.

Another object of embodiments of the invention is to increase search performance through pre-processing.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, the efficient method of location-based content management and delivery includes: a program storing computer-readable instructions therein for instructing a computer to perform analytical steps for generating a spatial hierarchy identifier that corresponds to a spatial hierarchy used on a server, the program includes a recording medium readable by the computer; and the computer instructions stored on said recording medium instructing the computer to perform the processes including identifying a position using a position indication system, and generating an identifier within the computer and independent of the server, wherein the identifier identifies first regions within the first spatial hierarchy on the server corresponding to the position.

In another aspect, the a program storing computer-readable instructions therein for instructing a computer to perform analytical steps for generating a spatial hierarchy identifier, the program includes: a recording medium readable by the computer; and the computer instructions stored on said recording medium instructing the computer to perform the processes including receiving a position from a computer on a network, and generating an identifier within the computer and independent of the server, wherein the identifier identifies first regions within the first spatial hierarchy on the server corresponding to the position.

In another aspect, a program storing computer-readable instructions therein for instructing a computer to perform analytical steps for associating content with an area of influence, the program includes: a recording medium readable by the computer; and the computer instructions stored on said recording medium instructing the computer to perform the processes including associating content with a location and an area, generating a spatial hierarchy identifier associated with both the location and the area, and associating content with the spatial hierarchy identifier.

In another aspect, a program storing computer-readable instructions therein for instructing a computer to perform analytical steps for associating content with at least one spatial hierarchy identifier, the program including: a recording medium readable by the computer; and the computer instructions stored on said recording medium instructing the computer to perform the processes including associating content with a position, generating first regions of a surface, creating first identifiers for each of the first regions, generating second regions of the surface that are different than the first regions, creating second identifiers for each of the second regions, and associating content to at least one of the first and second identifiers.

In another aspect, a program storing computer-readable instructions therein for instructing a computer to perform analytical steps for determining at least one resource associated with a section of a spatial hierarchy, the program includes: a recording medium readable by the computer; and the computer instructions stored on said recording medium instructing the computer to perform the processes including generating first recursive regions of a surface, creating a first identifiers for each of the first regions, associating resources with sections of the spatial hierarchy, and searching the spatial hierarchy identifiers to determine a resource associated with a particular spatial hierarchy identifier.

In another aspect, a program storing computer-readable instructions therein for instructing a computer to perform analytical steps for routing requests associated with a section of a spatial hierarchy to one or more resources associated with a section of a spatial hierarchy, the program including: a recording medium readable by the computer; and the computer instructions stored on said recording medium instructing the computer to perform the processes including receiving a first request associated with a position from a requestor, retrieving the list of resources associated with a section of a spatial hierarchy based upon the position, routing a second request to the resources on the retrieved list.

In another aspect, a program storing computer-readable instructions therein for instructing a computer to perform analytical steps for responding to a request associated with a first section of a first spatial hierarchy and responding to requests associated with the same first section of a first spatial hierarchy, the program includes: a recording medium readable by the computer; and the computer instructions stored on said recording medium instructing the computer to perform the processes including receiving information, positioning information within a first data structure of a first section of the first spatial hierarchy, receiving a request associated with the first section of the first spatial hierarchy, and traversing the first data structure performing the request.

In yet another aspect, a program storing computer-readable instructions therein for instructing a computer to perform analytical steps for invoking a listening agent associated with a section of a spatial hierarchy, the program includes: a recording medium readable by the computer; and the computer instructions stored on said recording medium instructing the computer to perform the processes including associating a listening agent with a section of the spatial hierarchy, receiving a request associated with the section of the spatial hierarchy, traversing the section of the spatial hierarchy to perform the requested operation, and activating the listening agent to evaluate the request to determine if one of an instruction and data matches a criteria of the listening agent.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
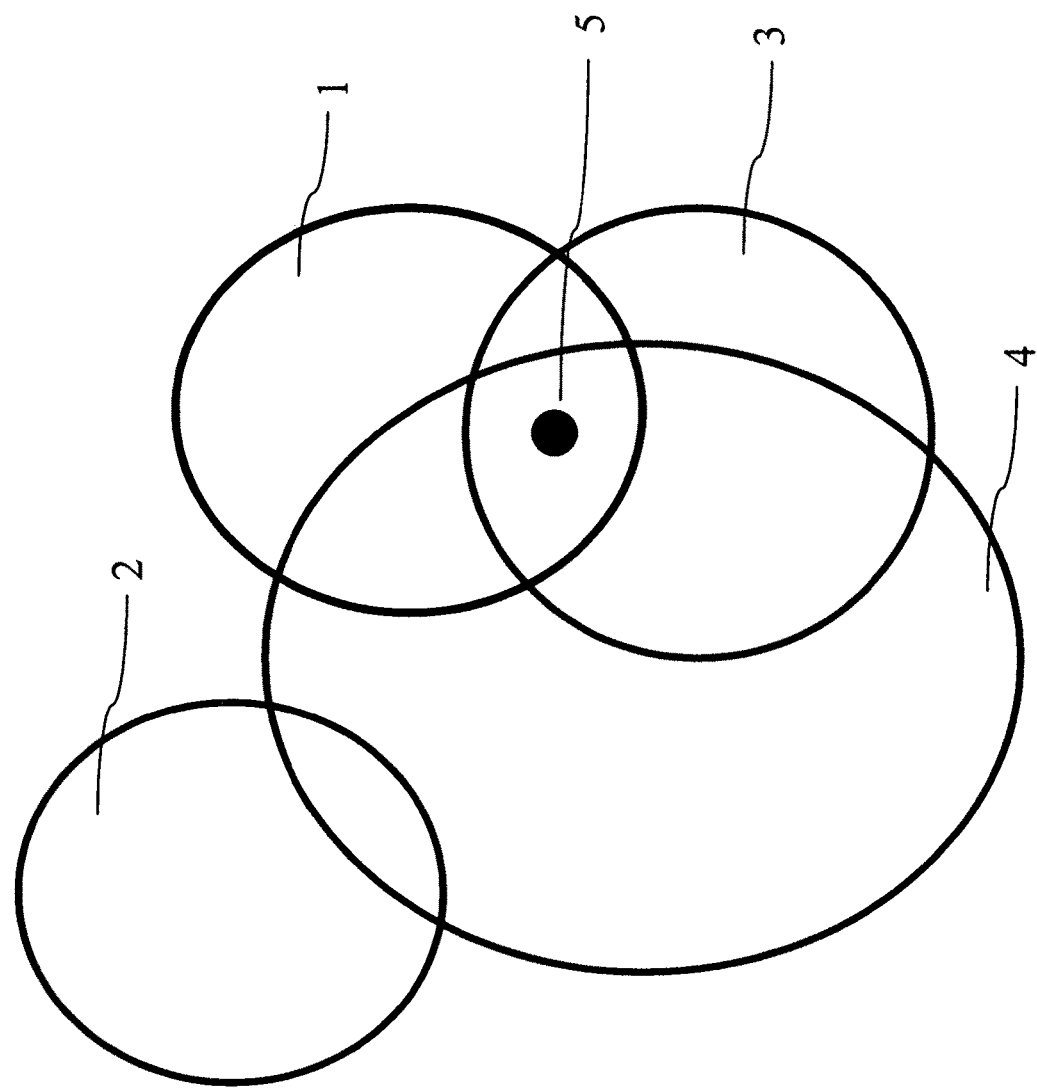
FIG. 1 shows associating information with an area of influence and determining relevance based on a point-in-area query.

FIG. 1 shows associating information with areas of influence 1-4 and determining based on a point-in-area query. The information associated with any area of influence that contains point 5 is relevant. As shown in FIG. 1, the information associated with first, third and fourth areas of influence 1, 3, and 4 is relevant. The information associated with the second area of influence 2 is not relevant since the query point 5 is not contained within the second area of influence. By assigning varying areas of influence to information associated with a location, point-in-area queries can be used to determine relevance. In some cases, the point-in-area queries will be the only measure of relevance, in other cases; it will be used with other information to determine relevance.

Embodiments of the invention provide the ability to associate any geospatial or physical location in the world with data or a reference to data. The data can be text, html, xml, RSS, images, audio, video, or any other media. The invention allows physical locations to be associated to references to any data accessible via a computer network or the Internet. The reference can be in the form of a URL. The referenced content can be dynamic content, including real simply syndication (RSS).

The notion of a "virtual" data broadcasting will be used in describing embodiments of the invention. That is, any physical location can be associated with a data broadcast. Thus, when a mobile phone, or other mobile device, is within some defined range of the physical location, phone can receive the data associated with the physical location. For example, a coffee shop can have an RSS file on their web site detailing their specials for the day. The coffee shop can change their special daily or even hourly. The RSS file is registered within the geospatial directory with the address or latitude/longitude of the address for the coffee shop and an effective "broadcast" range. When a mobile device equipped with Global Positioning System (GPS) or some other positioning capability is within the range of the "virtual" data broadcasting, the phone can receive the information.

Any mobile device user can receive that information by using the mobile device software to query the distributed geospatial content staging server for entries that have a bounding area that overlaps the position of the mobile device. For example, a gas station can update their RSS file on their own or corporate web site with their daily gas prices. These RSS files show up on the mobile device and a user can see the prices of gasoline for different stores. If the user decides to select a specific gas station, the user can get driving directions to the store.

Figure 2:
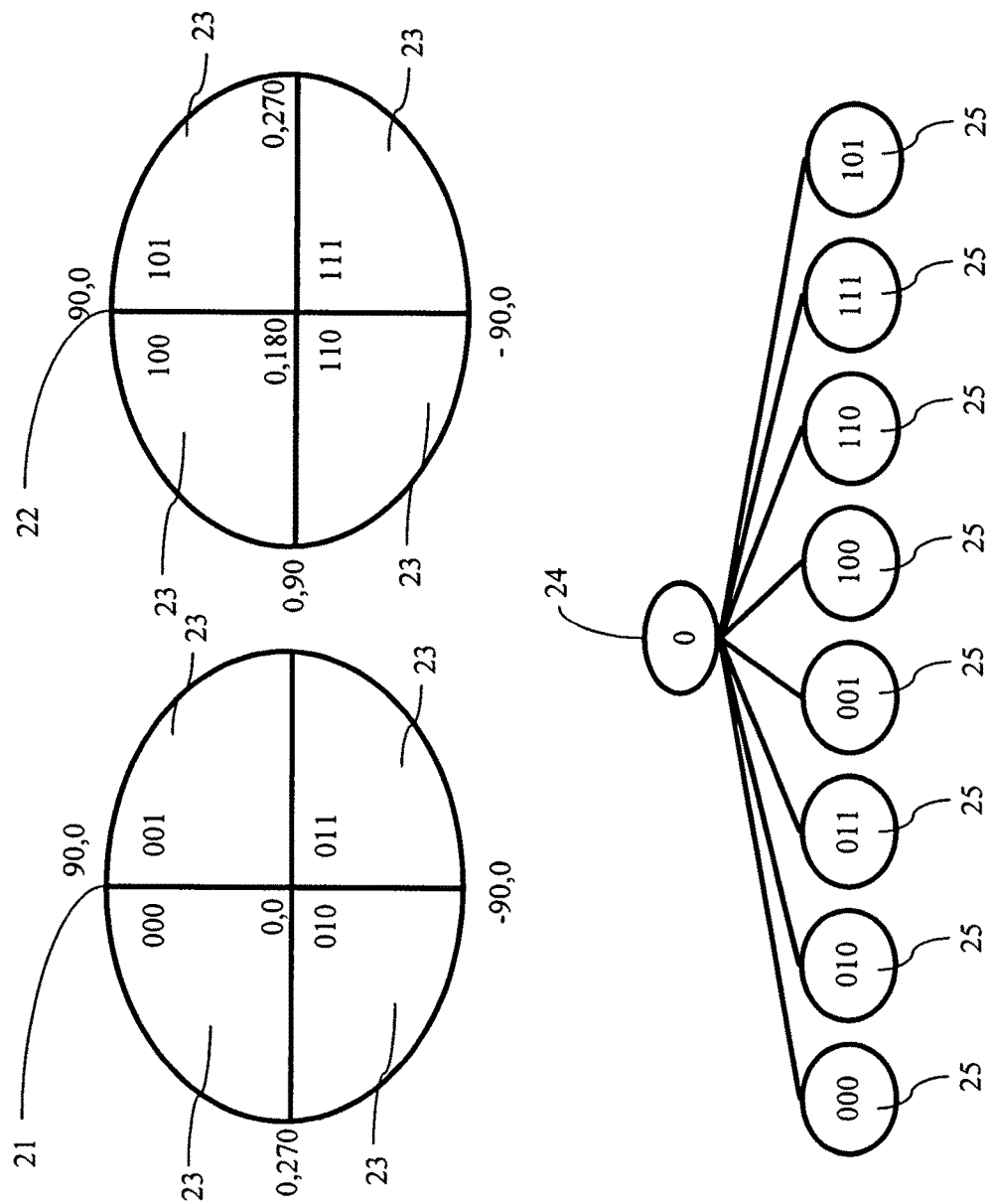
FIG. 2 shows the initial subdivision of a sphere within a universal spatial hierarchy.

FIG. 2 shows the initial subdivision of a sphere within a spatial hierarchy. Subdivision is the first step in generating a spatial hierarchy identifier. For simplicity, the sphere is shown in two halves, 21 and 22. The sphere is divided into eight spherical triangles 23. Each subdivision is assigned a bit identifier from 0-7, although a string identifier can be used as well. The depth of the initial subdivision is 0. Depth specifies the level of recursive subdivision.

The specific recursive subdivision of a sphere shown in FIG. 2 is known as hierarchical triangular mesh. However, any regular decomposition of space can be used. The corresponding data structure 24 contains a root node and eight child nodes 25, each associated with a spherical triangle of the initial subdivision. For instance, one of the spherical triangles 23 has an identifier of {000} that corresponds to the child node 25 with an identifier of {000}. Each child node is therefore associated with the entire region of its corresponding spherical triangle. There is no overlap between nodes at the same depth. All space is allocated.

Figure 3:
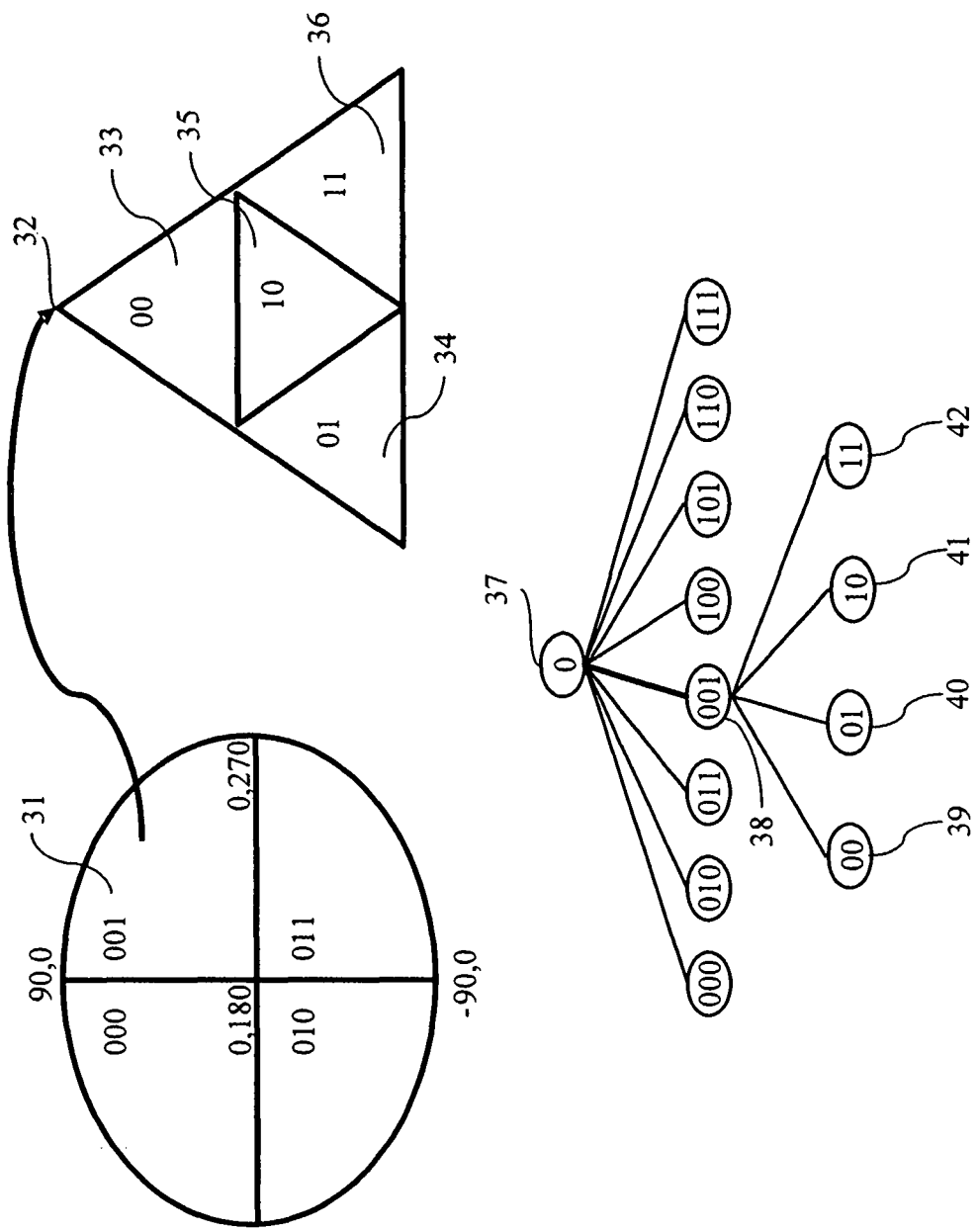
FIG. 3 shows the subdivision of a spherical triangle and resulting spatial hierarchy.

FIG. 3 shows how a spherical triangle can be further recursed into four sub-triangles and the corresponding data structure 37. Spherical triangle 31 is subdivided into four sub-triangles, 33, 34, 35 and 36. Spherical triangle 31 is associated with node 38 in the data structure. This node has four children, 39-42. These children correspond to the sub-triangles, 33-36. The recursive subdivision can continue until level or depth 26, when the computer representation of numbers, double precision, no longer supports the continued subdivision of space.

Figure 4:
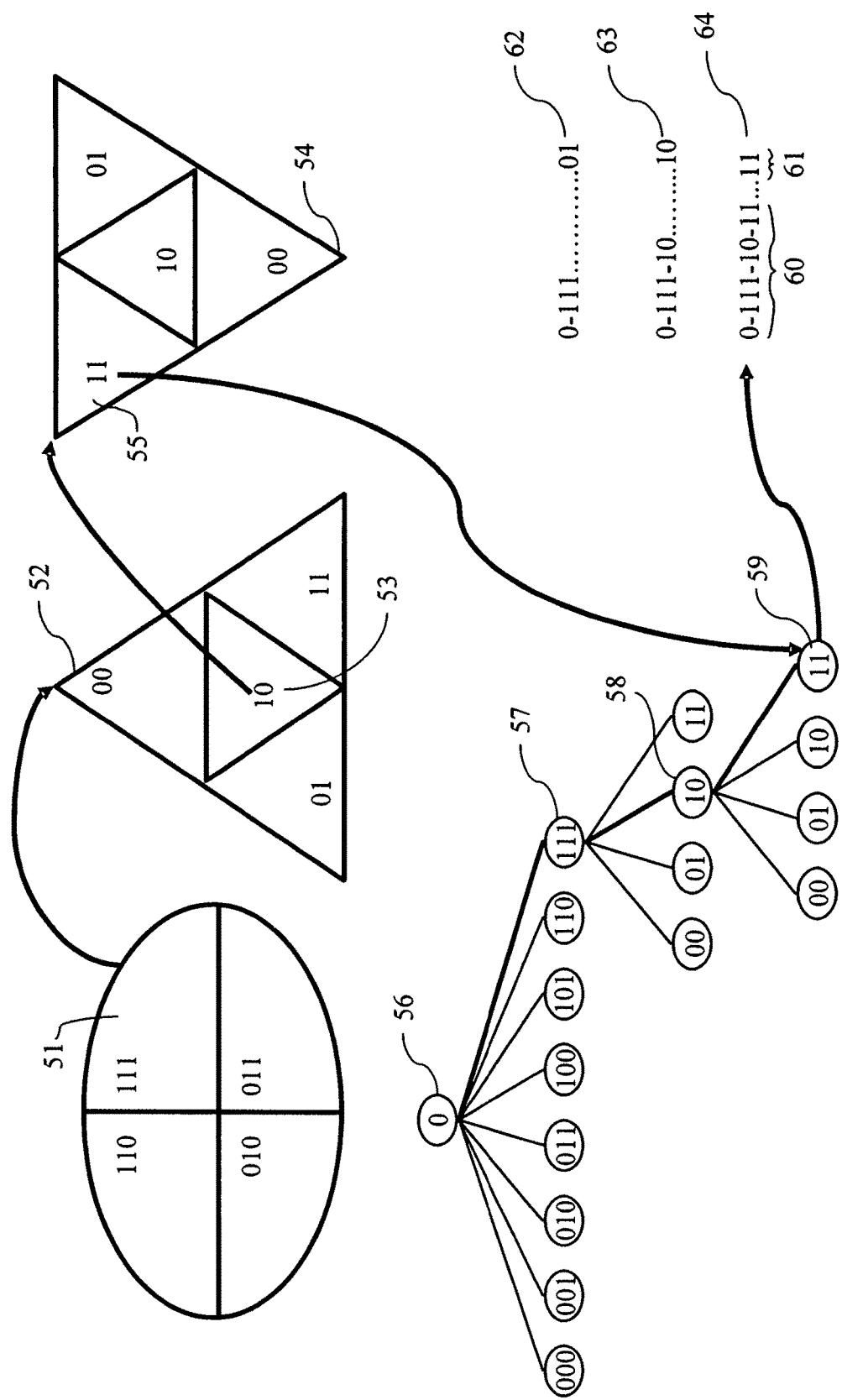
FIG. 4 shows the further recursive decomposition of successive triangles and resulting data structure.

FIG. 4 shows several levels of subdivision, the associated data structure 56, and the resulting spatial hierarchy identifiers 62, 63, and 64 at several levels. Although the associated data structure is shown, the data structure is not used in the generation of the identifiers. The spatial hierarchy identifiers, which include a sequence of node identifiers and a depth, specify the path to a given node in the spatial hierarchy. A spherical triangle 51 is subdivided into four sub-triangles 52. A spherical triangle 51 has an assigned individual identifier {111}. The depth of spherical triangle 51 is one. Only the initial node {0} is in the path. Therefore, the generated spatial identifier for spherical triangle 51 is {0111 . . . 01}, which corresponds to node 57 in the data structure 56. The identifiers are typically held as 64-bit values, but for simplicity, only the bits significant for the associated depth are shown in FIG. 4.

Subdividing sub-triangle 53 of the four sub-triangles 52, gives four more second sub-level triangles 54. Sub-triangle 53 has an individual identifier of {10} and is at a second level depth indicated by {10}. Combining the individual identifier of the spherical parent triangle {111} for sub-triangle 53, the individual identifier {10} for sub-triangle 53, and the second level depth {10}, generates the full identifier 63 for the sub-triangle 53 as {011110 . . . 10}. Sub-triangle 53 corresponds to a node 58 in the data structure 56. The parent of sub-triangle 53 is the corresponding node 57 of the spherical parent triangle 51. Sub-triangle 53 is then subdivided into four second sub-level triangles 54. Second sub-level triangle 55 is shown is node 59 identified by the full identifier 64 of {01111011 . . . 11}. The full identifier of the second sub-level triangle 55 has three parts, the path {0-111-10} through other nodes, the individual identifier {11} of the second sub-level triangle 55 and the third level depth {11}.

Figure 5:
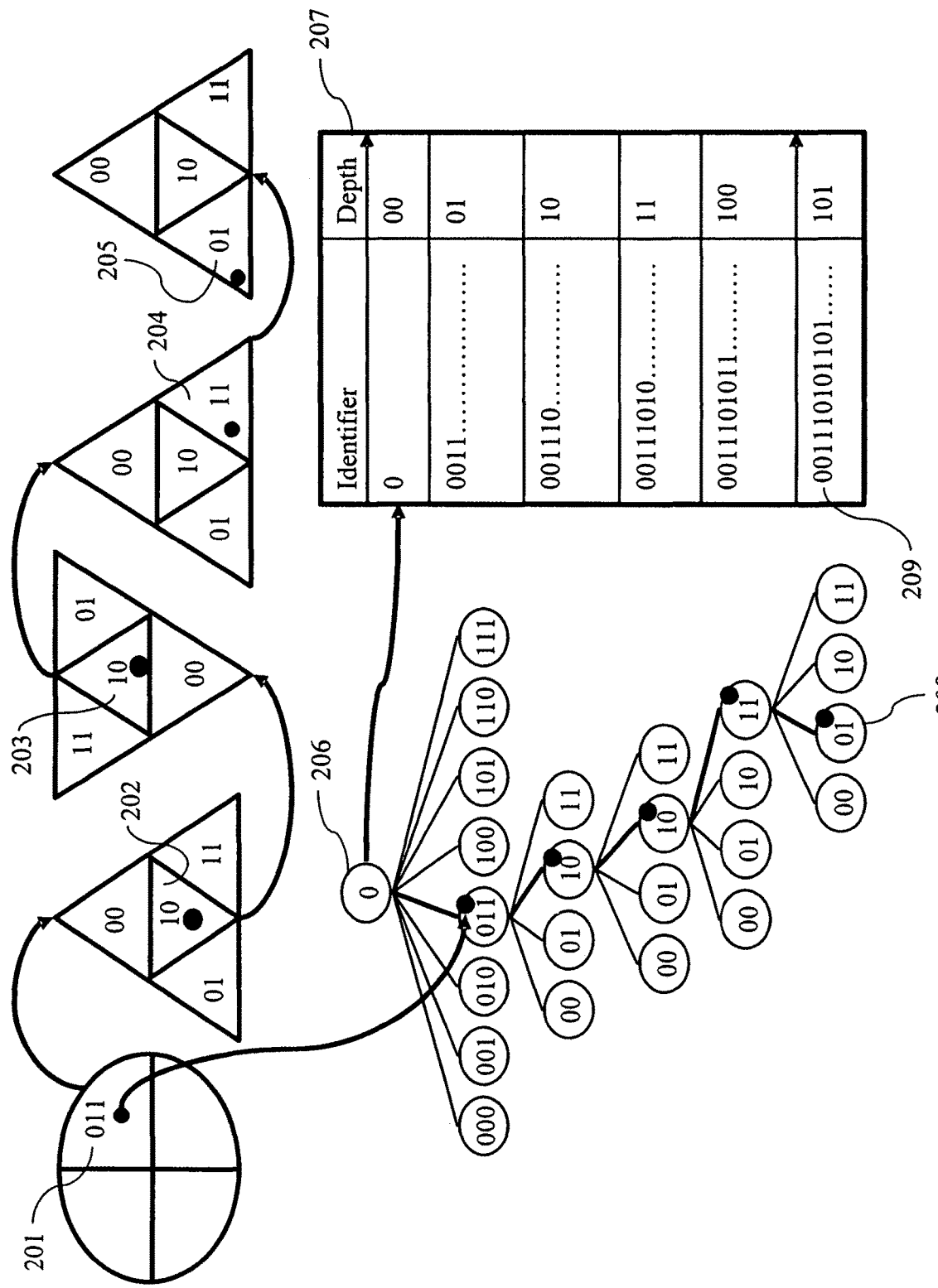
FIG. 5 shows the generation of a spatial hierarchy identifier for a location.

FIG. 5 shows the generation of a spatial hierarchy identifier for a location. The point is located in spherical triangle 201 with an individual identifier of {011}. Spherical triangle 201 is subdivided into four sub-triangles. In the next level, the point is in sub-triangle 202 with an individual identifier of {10}. Sub-triangle 202 is subdivided into four second sub-level triangles. In the next level, the point is second sub-level triangle 203 with an individual identifier of {10}. Since this recursive subdivision is generating an identifier for a point location, the recursive subdivision continues until the maximum depth specified for the spatial hierarchy is reached. The maximum depth specified for the spatial hierarchy shown is set to five.

During the recursive process, the path that the process follows down the tree is being stored, and each node identifier is appended to the path. Table 207 shows the identifiers at each level. The recursive subdivision is terminated at level five and the identifier 209 for the point location is generated. The corresponding node 208 in the data structure 206 is shown. The data structure 206 also shows which nodes in the path contain the point. The nodes that contain the point are the only ones subdivided in the generation process.

The recursive subdivision is independent of a data structure or data set, unlike some spatial indexing techniques, such as R-trees. Therefore, a mobile communications device can independently generate a spatial hierarchy identifier if the mobile communications device knows a position, either its own position or a position provided to the phone, and has an algorithm for the recursive subdivision of space. The spatial hierarchy identifier can be generated simply by recursively subdividing each region that includes the position until a specified depth is reached. The calculations to perform the subdivision are well known in the art.

Due to the ability to generate spatial identifiers independently of a data set or data structure, the generation process can be performed on the mobile device with a limited amount of software and no information about the spatial database other than what spatial hierarchies are supported and the specification for generating the spatial hierarchy identifiers. A mobile device can be a cell phone, personal digital assistant, laptop, smartphone, portable media player, information appliance, personal communicator, wearable computers, or other computing devices that can be easily moved. The specification will contain information such as how to subdivide space, the geometry of the subdivisions, the maximum depth of the subdivision, and any other information required. This allows the mobile device to preprocess any query or other request, thus saving significant computing resources on the computers performing the search. For the preprocessing of a query or request into a spatial identifier to be useful, the spatial identifier generation specification must be known to the mobile device and correspond to the spatial identifier generation specifications used by any services or software that process the mobile devices requests. An example of how to perform these calculations on a mobile device is included.

The earth is first subdivided into 8 spherical triangles of equal size. Each triangle is given a 3-bit identifier, 0-7. The mobile phone first determines which of the 8 triangles the phone is located within. The first 3 bits of the index are set to the corresponding 3-bit value. The selected triangle is then recursively subdivided into 4 triangles. Each triangle has a 2-bit identifier of 0, 1, 2 or 3. The mobile phone then calculates which of those triangles that the phone is located within, and then recursively continues until it has reached the desired depth. For a point location, such as the position of a mobile phone, the recursive calculation continues until the specified maximum depth is reached.

Figure 6:
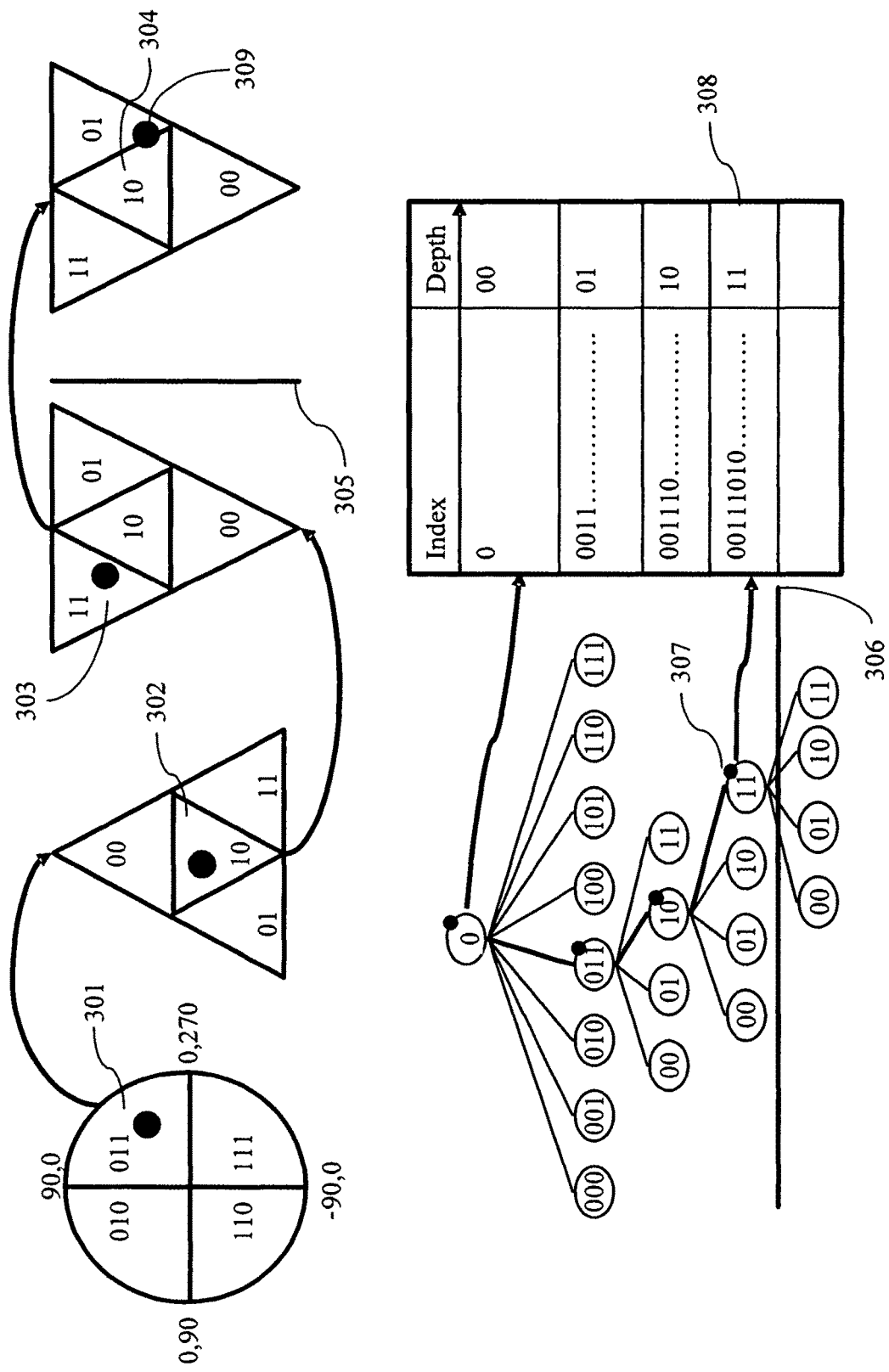
FIG. 6 shows the generation of a first spatial hierarchy identifier for an area.

FIG. 6 shows the generation of a first spatial hierarchy identifier for an area. Spherical triangle 301 contains the area. It is subdivided into four triangles. The area is fully contained in triangle 302 of that subdivision. Triangle 302 is subdivided. The area is fully contained in triangle 303 of that subdivision. Triangle 303 is subdivided and it is determined that the area is not fully contained in any of these subdivisions. Although area 309 is small enough size to fit within a subdivision, area 309 crosses the subdivision boundary 304. The recursive algorithm stops at this point. FIG. 6 shows where the subdivision stops 305. FIG. 6 also shows where the corresponding data structure stops 306. The spatial hierarchy identifier 308 for the area is shown. This identifier corresponds to node 307 of a data structure. The identifier describes the path from the root node to the node specified by the spatial hierarchy identifier. This is beneficial because any search or other operation can determine independently which nodes in a tree must be included to perform a given operation. The calculations for determining if an area is fully contained in any of the possible geometries, such as triangles or rectangles, are well known in the art. Just like the case of generating a spatial hierarchy identifier for a point location, only the subdividing regions containing the area are recursively subdivided.

Figure 7:
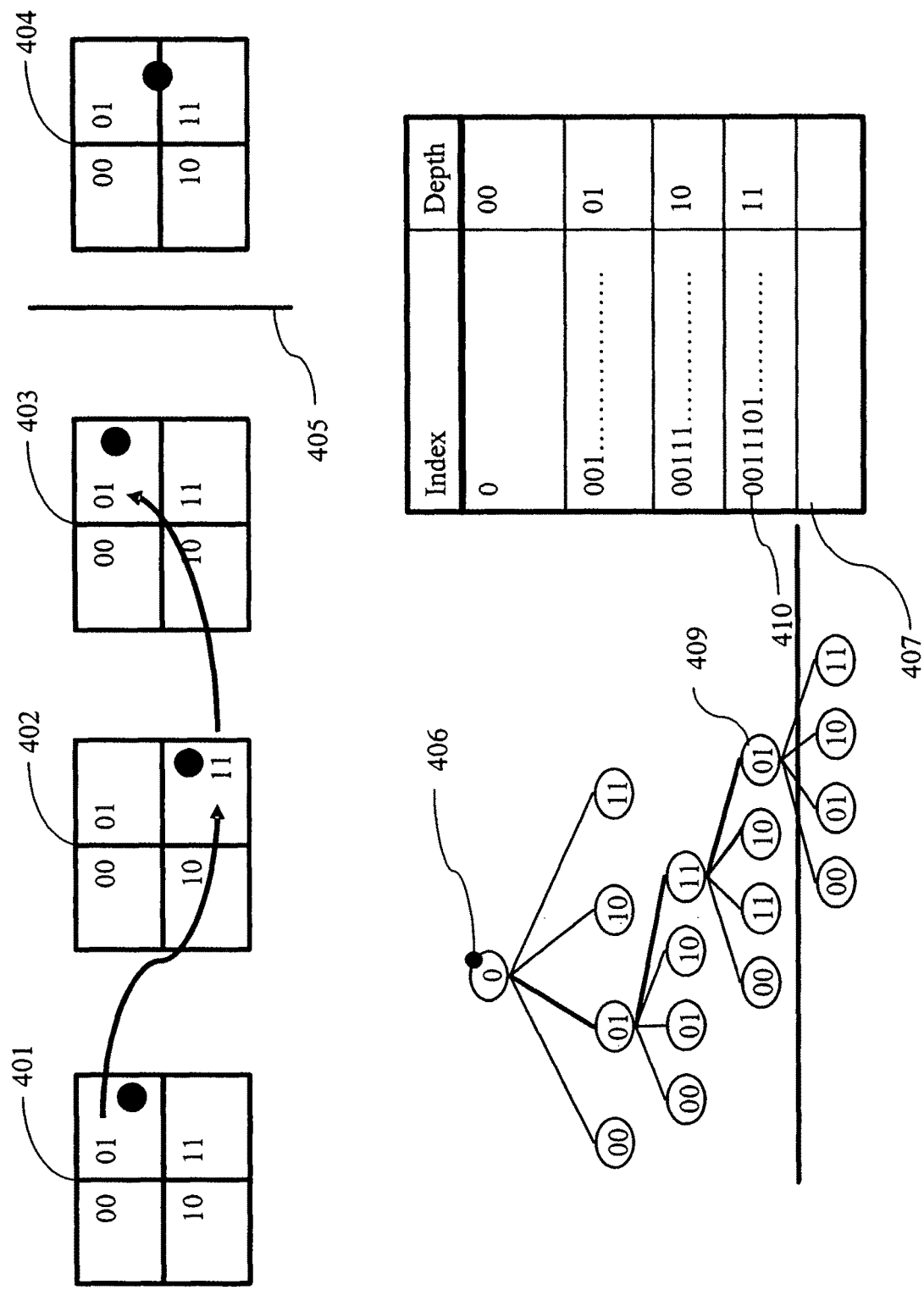
FIG. 7 shows the generation a second spatial hierarchy identifier for an area.

FIG. 7 shows the generation of a second spatial hierarchy identifier for an area. This second spatial hierarchy subdivides the space differently than the first spatial hierarchy, and therefore has a different spatial identifier for the same exact area. The subdivision shown is a typical quad-tree subdivision. Space is divided into four quadrants 401. The quadrant containing the area is further subdivided into four quadrants 402. This continues until the area is no longer fully contained in a quadrant. This occurs in subdivision 404. FIG. 7 shows where the recursive subdivision stops 405 and where the data structure stops, 407. FIG. 7 also shows the corresponding quad-tree data structure 406. Subdivision 403 is the last subdivision with a quadrant fully containing the area. The spatial hierarchy identifier 410 as shown in Table 407 for this area is the path to this subdivision and the depth in the recursion. The identifier 410 is associated with node 409 in the data structure.

FIG. 7 further shows that the depth of the spatial hierarchy identifier is greater than the resultant depth. This is important because it demonstrates that generating two or more spatial identifiers that are different is useful. In tree-based index data structures, it is more efficient for data items to be located deeper within the data structure. In spatial indexing of objects with shape and size, they can't be located at the leaf nodes unless the object is stored in each leaf node that the object intersects, and for simplicity, should be located at the deepest level in the tree for which they are fully contained. However, small objects that cross boundaries end up at higher levels of the tree than their size warrants. FIG. 6 shows a small object, area 309, with a small size that happens to cross a boundary, and therefore is not located at the optimal level of the data structure for an object of that size. These small objects must be evaluated every time the node in which the small objects are located in is traversed during a search operation.

There are many ways to create first and second spatial hierarchies that are different. They can use different subdivisions, coordinate systems, map projections, or geometries.

Figure 8:
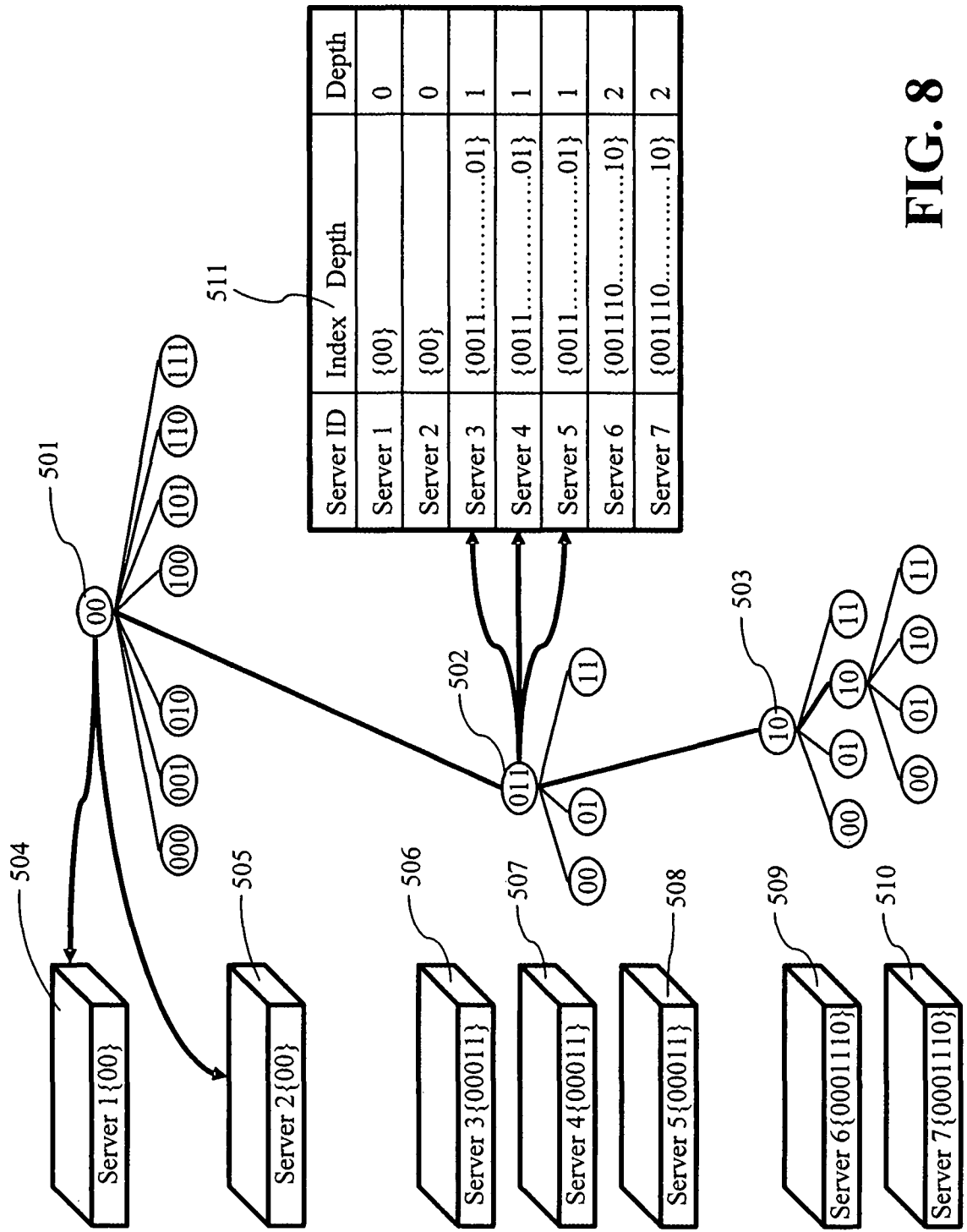
FIG. 8 shows the mapping of computing resources to sections of a spatial hierarchy.

FIG. 8 shows the map 511 of computing resources to a spatial hierarchy. A spatial hierarchy is broken up into sections and the resulting data structures 501-503 are shown. A section of a spatial hierarchy is a set of connected regions that are fully contained in the highest level region in the set of connected regions. A section of a spatial hierarchy is represented by a tree data structure. Each data structure is assigned to a computing resource. Computing resource 504 and 505 are assigned to section 501. Computing resources 506-508 are assigned to section 502. Computing resource 509 and 510 are assigned to section 503. To handle a point in area query with associated identifier {001110 . . . 10}, data structures 501-503 would be involved since a point-in-area query would need to the node associated with the point's spatial hierarchy identifier and all of its parent nodes. Multiple resources can be assigned to the same sections of a spatial identifier. However, during a query, only one of the resources for a section is needed. This provides a mechanism for efficient load balancing. The choice of which resource to use can be made based on round-robin scheduling, usage statistics, or through distributed queues, which provide a good load-balancing scheme, since faster resources that finish their jobs quickly will simply come to the queue to request another job more often. The faster resources will be tasked more than slower resources.

The map is hierarchical, just like the spatial hierarchy identifiers. Server 504 and 505 know they do not handle section 502 of the spatial hierarchy even though they are in its path to the root node. This is because there is an entry in the map for that section that specifies other servers. It is important for these servers 504 and 505 to know what sections that are children of their assigned section of the spatial hierarchy that servers 504 and 505 do not handle, so that servers 504 and 505 do not create the data structure for those sections or fill the data structure with data associated with those sections.

Since each index in the hierarchical triangular mesh represents a node in the quad-tree and the depth into the tree, any node of the quad-tree and its children can be assigned to different servers, Java virtual machines, or other computer processes. A database table holds the map that defines which servers handle which quad-tree nodes and children. Each entry includes the address (IP and port) of the server, the server identifier, the index of the quad-tree node, and the depth of the quad-tree node. A simple search algorithm is used to determine which server or servers handle a specific target quad-tree node.

Computing resources can be computers, hardware components within computers or networks, software components such as programs, processes, threads, distributed queues, message topics, or message brokers. Computing resources are associated with a spatial hierarchy identifier, which includes depth. This creates a hierarchical map that can be used to identify for a given spatial hierarchy identifier, which computing resources are assigned to the sections of the spatial hierarchy defined in the identifier. In the preferred embodiment, hierarchical triangular mesh is used. The map can be kept in a tree, list, table, or other data structure.

To find the computing resources necessary to respond to a request, the map is searched based on a spatial identifier contained in the request. The request may alternatively contain a position, which can be a point location or an area. In this case, a new spatial identifier is generated and associated with the request. The map is searched for all spatial identifiers that are prefixes of the spatial identifier associated with the request, exactly match the spatial identifier, or the spatial identifier associated with the request is a prefix of the spatial identifier in the map.

If a first spatial hierarchy identifier associated with a first spatial hierarchy is a prefix of a second spatial hierarchy identifier associated with the same spatial hierarchy, the first hierarchy spatial identifier represents a region that fully contains the region associated with the second spatial hierarchy identifier. If the first spatial hierarchy identifier is the same as the second spatial hierarchy identifier, then the first spatial hierarchy identifier is associated with the same region as the second spatial hierarchy identifier. If the first and second spatial hierarchy identifiers are not prefixes of each other and are not the same, then the regions associated with the spatial hierarchy identifiers do not contain, intersect, or overlap each other.

Figure 9:
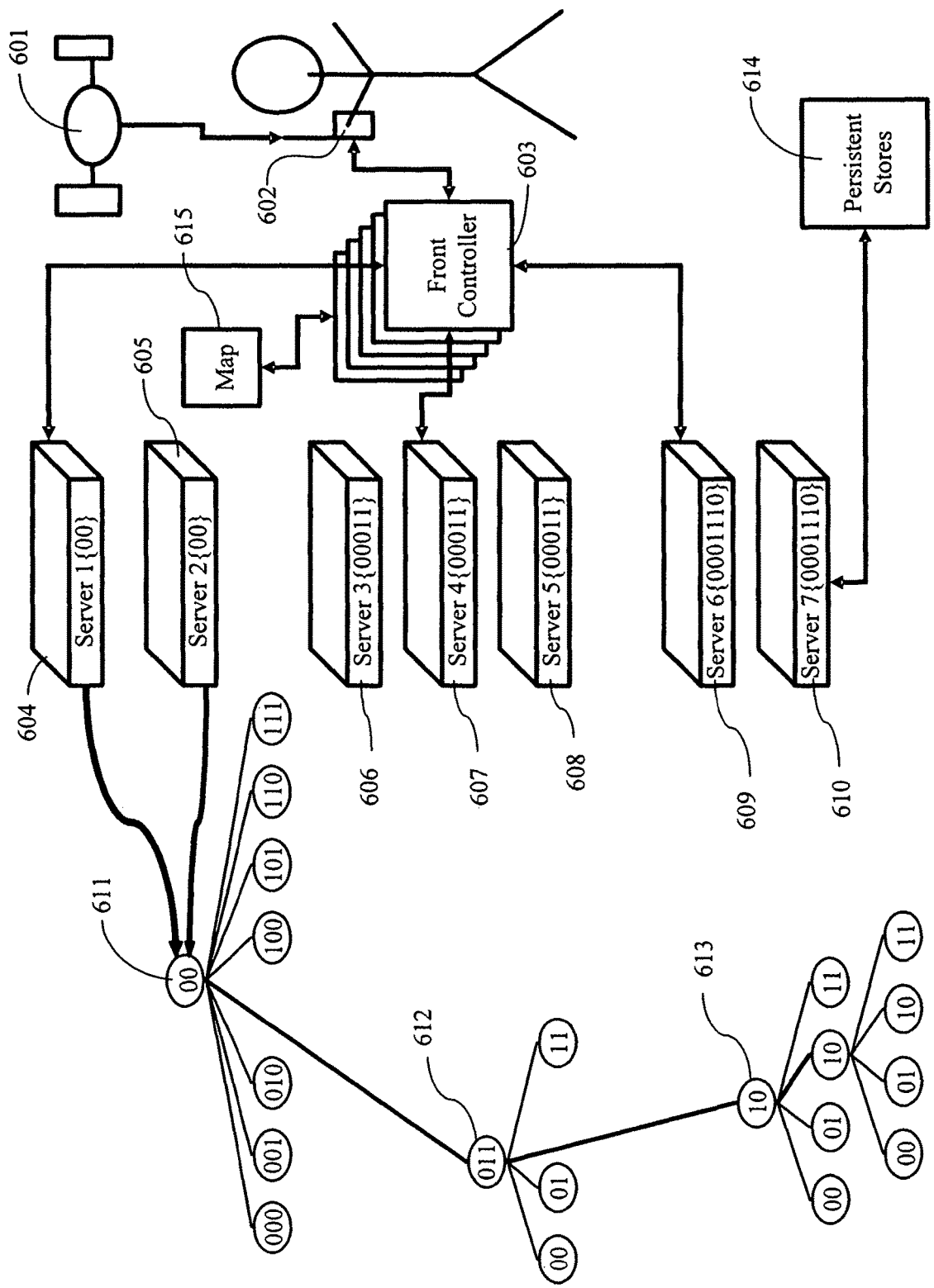
FIG. 9 shows how the front controller routes requests to the distributed spatial hierarchy in parallel.

FIG. 9 shows how the front controller 603 routes requests to the distributed spatial hierarchy in parallel. The user of the mobile device decides to search for relevant information at the user's current location and initiates a search request. The mobile device 602 calculates its position based on a GPS positioning system 601, generates at least one spatial hierarchy identifier, and transmits the request containing the identifier and position to a web server or other server software that handles network requests. The server software may be the front-controller 603, may contain the front-controller, or may pass the request modified or unmodified to the front-controller. There may be more than one front-controller, as they may be deployed in a cluster, distributed across the Internet, or set up in other scaleable ways. The load balancing of these components can be accomplished in a variety of ways, including methods used to load-balance web servers. The front-controller can also be logically made up of multiple components that accomplish the same function as a front-controller.

The request transmitted from the mobile device to the front-controller can just contain the position, contain the set of identifiers, or contain both the position and the set of identifiers. A position can be calculated from an identifier, but only at the precision associated with the level in the spatial hierarchy identified by the depth of the identifier. In one embodiment, the identifiers are generated and sent with the position, so the front-controller(s) does not have to use computing resources to perform the generation. The position is included in the preferred embodiment so that the final exact geometric calculations can be performed to verify which candidate objects match the search criteria exactly. The front-controller queries the spatial hierarchy map 615 to find the staging servers associated with the identifier provided by the mobile device. There must be an agreement or convention on which identifier provided by the mobile device corresponds to the spatial hierarchy that is being distributed across multiple computing resources.

The spatial hierarchy map 615 may be implemented in many different ways. The spatial hierarchy map 615 can be a service queried over the network or can be kept in a local database. In another alternative, the spatial hierarchy map 615 can be local data that is replicated among multiple nodes. In yet another alternative, the map can be cached. Updates to the map can be distributed using a variety of mechanisms, such as publish/subscribe messaging.

FIG. 9 also shows the resources 604-610 assigned to various sections of the spatial hierarchy. Multiple resources 604, 605 are assigned to the same section of the spatial hierarchy. To handle the request, whose identifier is associated with that section of the spatial hierarchy, the front-controller must determine which resource to pass the request or a derivative request to. When no precomputed spatial hierarchy identifiers are included in the initial request, the front-controller generates the one or more spatial hierarchy identifiers from the position contained in the initial request and creates a derivative request containing the identifiers and the position included in the initial request. The derivative request also contains the type of request and any other information relevant to the specified type of request. The determination can be random, round-robin, statistics based, or messaging based. A software implementation of the spatial hierarchy map can also include a load-balancing scheme, and therefore only return non-duplicates.

In the messaging based case, each resource listens to a distributed queue associated to their section of the spatial hierarchy. The front-controller published the request to that queue. Messages published to a distributed queue are only received once. Whichever resource receives the message from the queue processes the request.

Once the resources have been determined the front-controller requests each resource 604, 607, 609 to conduct a search of their section of the spatial hierarchies. These requests are sent in parallel. Each resource processes the search and returns the results. The front-controller gathers the results, and if a resource does not return a result in a certain period of time, the request times-out and the front-controller returns an error or partial result to the mobile phone or other requestor. A requester can be any computer, computing resource or computing device that can make a request of the front-controller.

There can be many types of requests such as searches, inserts, updates, and deletes. Some requests may returns results and other requests will not return results. Some requests will be synchronous and others will be asynchronous.

A mobile device performs a query at a specific location based on the GPS component of the mobile device. That is passed to the front-controller servlet (or other web application, such as CGI). The servlet calculates the geospatial index or uses the calculated index passed in from the mobile device to determine what staging servers are holding content application to that geospatial location. Multiple servers for a specific geospatial index can be returned. Multiple servers are used for load-balancing purposes. The front-controller then picks all the servers for each part of the quaternary tree that is in the path of the target node. In the case of multiple servers, the front-controller picks one based on round robin or statistics. The query is passed to all of the chosen servers in parallel and each performs the query. The servers recurse through each quad-tree held by the server and collect the results. At each node in the quad-tree, other criteria besides position can be evaluated. When all the results come in or have timed-out, the results are passed back to the mobile device. The front-controller can also be load-balanced using typical Internet techniques for load-balancing web servers."

FIG. 9 also shows the persistent store 614 that manages the content for the system. FIG. 9 shows a staging server 610, loading initial content from a persistent data store 614. A staging server is a computer program that is associated with a section of a spatial hierarchy. The staging server receives or loads content associated with a position or spatial identifier. If no spatial identifier is associated with the content, then the staging server generates the identifier. Each staging server creates a data structure corresponding to the section of the spatial hierarchy that has been assigned to the server. The created data structure represents a section of the global tree data structure. Nodes in the data structure are only created when the nodes will store content or other objects or when they are in the path from the root node of the assigned section of the spatial hierarchy to any node that contains content or other objects. The staging servers place or "stage" the received or loaded content or objects in the appropriate node of the data structure that corresponds to the spatial hierarchy identifier associated with the content or object.

When each "live" staging server starts or restarts, the server will query the underlying content database and then use the results to fill its in-memory quad-tree for the portion of the quad-tree that it is supposed to manage. The underlying content database will include an HTM index and depth each piece of content. Pre-computing and storing these values in the underlying content database will speed up startup and restart of the "live" staging server. To further optimize the initialization, the index can be stored as a string. Instead of binary {0101010110101}, the actual string representation can be stored. A SQL query can be used to find all nodes that start with the same index specified in the server map entry for a given server. All content that matches that index and has depth>=server map entry starting depth and has depth<=server map entry ending depth should be handled by that server."

Figure 10:
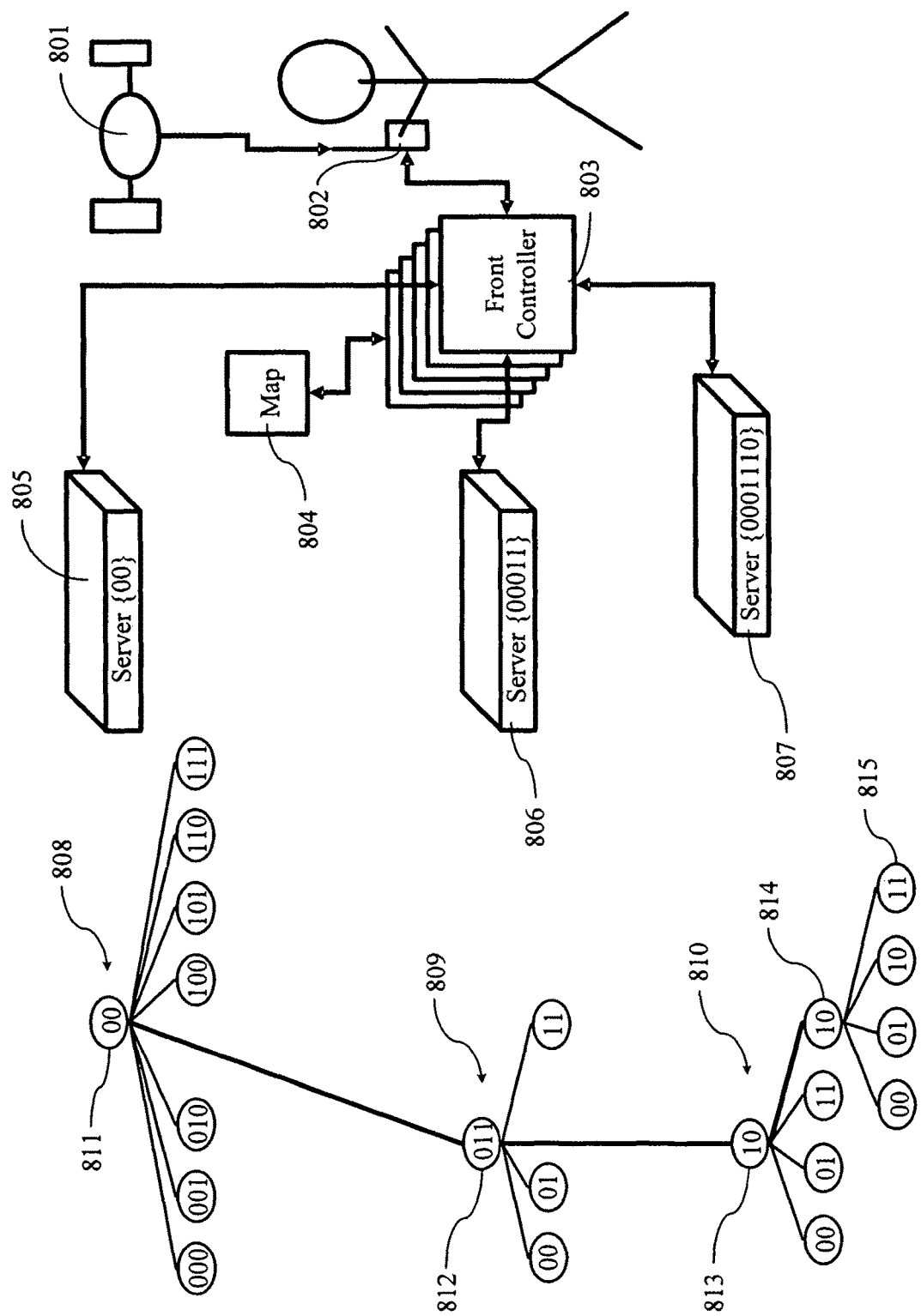
FIG. 10 shows a parallel, distributed point in area query.

FIG. 10 shows a parallel, distributed point in area query. The mobile device 802 receives its position from a positioning system 801. The mobile device can report its position automatically or when the user makes a request. An example request is a search. The mobile device generates a set of identifiers that correspond to the required set of identifiers for the front-controller 803. The position and set of identifiers are transmitted to a front-controller 803. The front-controller uses the spatial hierarchy map 805 to determine which servers correspond to the set of identifiers for the request. If multiple servers for the same section are provided, the duplicates are removed using a load-balancing scheme.

Servers 804-806 are identified as holding the sections of the spatial hierarchy corresponding to the received spatial hierarchy identifier. Each of them processes the request. Server 805 uses the spatial hierarchy identifier to search the nodes of the data structure 808 that match the identifier. The point in area query has spatial hierarchy identifier {00011101011 . . . 100}, the {100} specifying depth 4. The node specified by the spatial hierarchy identifier must be searched as well as all of its parent nodes, which are also specified in the identifier. This is because any object that might contain the query point must be in the path from the node at maximum depth containing the point to the root node. Server 805 evaluates all candidates objects stored in node 811, which is identified in the spatial hierarchy identifier as the first two bits, or {00}. Since server 805 holds no other applicable nodes, it returns the results to the front-controller 803. Each of the servers may evaluate each candidate strictly to determine if it is an exact match based on exact computation, or it may simply return all of the feasible candidates. This behavior is determined based on the request from the front-controller.

Server 806 with corresponding data structure 809 evaluates all candidates objects stored in node 812, which is identified in the spatial hierarchy identifier as the next three bits, or {011}. Since server 805 holds no other applicable nodes, it returns the results to the front-controller 803.

Server 807 with corresponding data structure 810 evaluates all candidate objects stored in nodes 813-815. Node 813 corresponds to the next two bits in the spatial hierarchy, {10}. Node 814 corresponds to the next two bits the spatial hierarchy identifier, {10}. Node 815 corresponds to the last two bits in the spatial hierarchy identifier, {11}. Since the path to each node that contains any part of the request is known, it is simple to walk down the tree data structures following the specified path, evaluating the contained objects to see if they are, in fact, matches to the point-in-area query.

Figure 11:
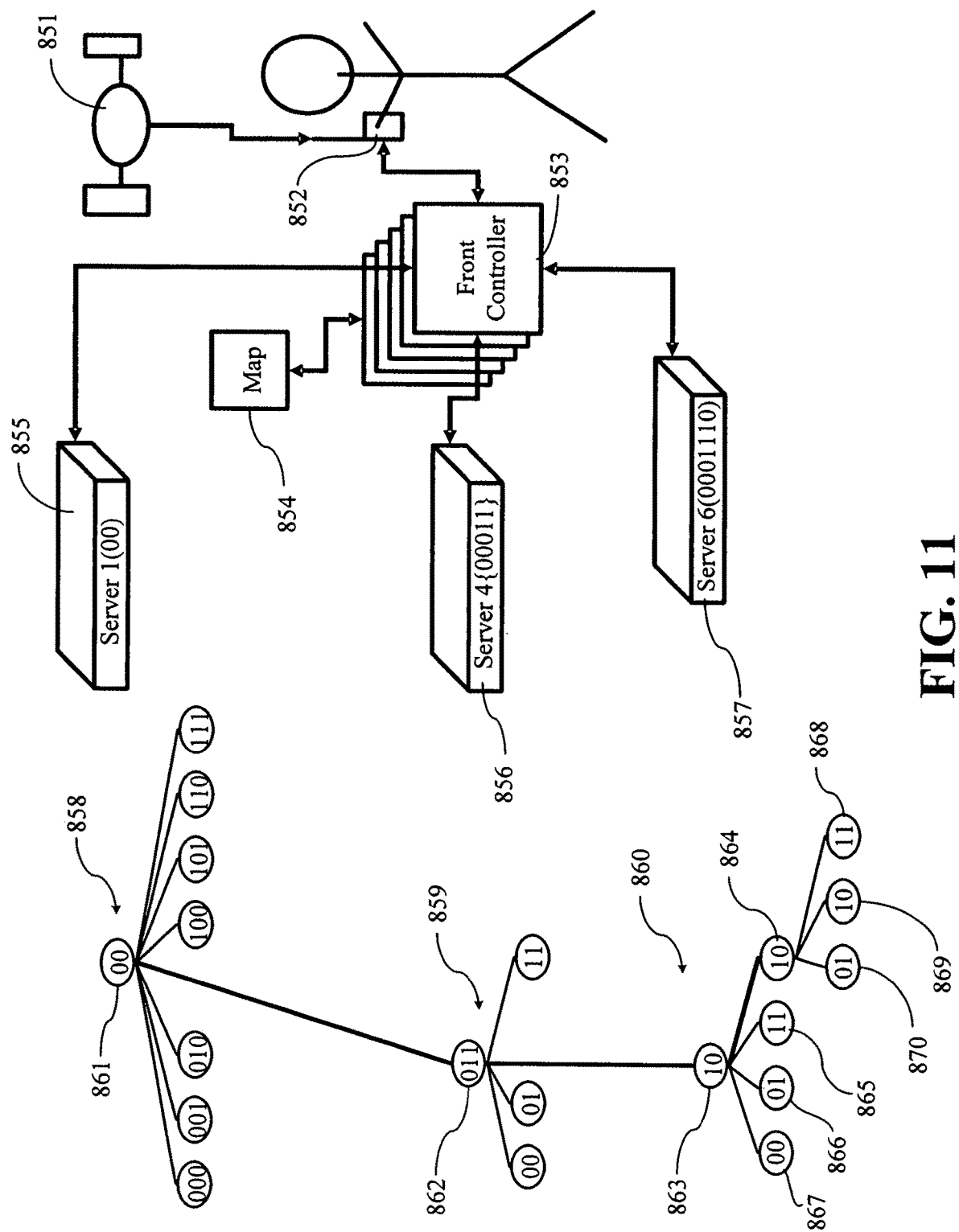
FIG. 11 shows how a parallel, distributed window query works.

FIG. 11 shows how a parallel, distributed window query works. The mobile device 852 receives its position from a positioning system 851. The mobile device can report its position automatically or when the user makes a request. An example request is a search. In the case of a search, the area is sent along. The spatial hierarchy identifier is calculated differently for an area than for a point. The deepest node that fully contains the area is determined and encoded in the identifier. The mobile device generates a set of identifiers that correspond to the required set of identifiers for the front-controller 3. The area and set of identifiers are transmitted to a front-controller 853. The front-controller uses the spatial hierarchy map 855 to determine which servers correspond to the set of identifiers for the request. If multiple servers for the same section are provided, the duplicates are removed using any load-balancing scheme.

Servers 854-856 are identified as holding the sections of the spatial hierarchy corresponding to the received spatial hierarchy identifier. Each of them processes the request. Server 855 uses the spatial hierarchy identifier to search the nodes of the data structure 858 that match the identifier. In this example, the spatial hierarchy identifier for the search area is {0001110 . . . 10}, which is at depth 2. Server 854 searches node 861, which corresponds to the first two bits, {00}. Server 856 searches node 862, which corresponds to the next two bits, {011}. Server 857 searches node 863, but since it is a window query, it searches all of the child nodes of node 863, which are labeled 864-870. The results are returned to the front-controller and it aggregates the results and sends them back to the mobile device initiating the query.

The data structure used in each server can be sparse. In other words, the data structure used in each server only contains nodes if the node contains anything or if the node is on the path from the server's root node to a node with content. In FIG. 11, node 864 may have no content, but it exists because children 868-870 of node 864 have content. Node 864 only has three child nodes, because the other child node would not have any content if such a child node existed and such a child node is not part of the path to another node. The global data structure corresponding to the entire spatial hierarchy is also sparse.

Figure 12:
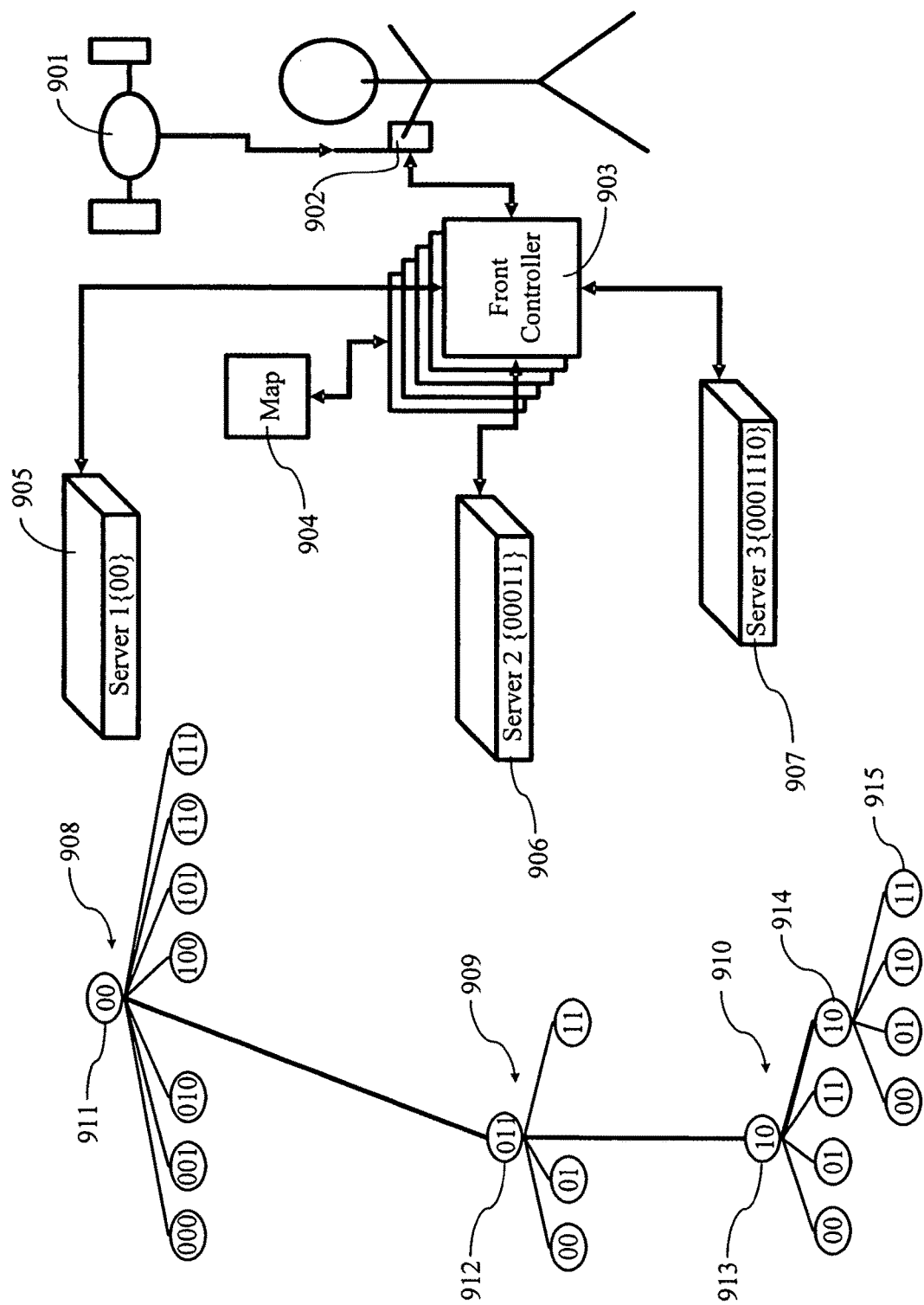
FIG. 12 shows a distributed, parallel method for evaluating listener objects or subscriptions in a distributed spatial hierarchy.

FIG. 12 shows a distributed, parallel method for evaluating listener objects or subscriptions in a distributed spatial hierarchy. Listening agents can be implemented as objects, code, or small programs that are stored in the data structure associated with a spatial hierarchy. The mobile device 902 calculates its position using positioning system 901. The mobile device generates a set of identifiers that correspond to the required set of identifiers for the front-controller 903. The position and set of identifiers are periodically, automatically, or upon user action transmitted to a front-controller 903. The spatial hierarchy identifier is {00011101011 . . . 100}. The front-controller uses the spatial hierarchy map 904 to determine which servers correspond to the set of identifiers for the request.

In the case of evaluating listening agents or subscriptions, load balancing can be used or not used, depending on implementation. In other words, if multiple resources are assigned the same section of spatial hierarchy, a subscription can be assigned to all of the resources or distributed amongst them. If the implementation chooses to distribute the subscriptions, then the front-controller 903 will send to all resources, regardless of duplicates, the mobile device position and set of identifiers.

Just like the point-in-area case, each node held in each server corresponding to the spatial hierarchy identifier will be visited. Any listening agents will be evaluated or activated to determine if the reported position of the mobile device is a trigger and should cause a notification event. For instance, node 914 may contain a coupon with an area of influence that if fully contained in node 914, but would not be fully contained by any of node 914's children. If the mobile device reports a position within the area of influence, the coupon should be sent to the mobile device. Server 905 stages content and objects using data structure 908. Server 906 stages content and objects using data structure 909. Server 907 stages content and objects using data structure 910. Server 905, 906, and 907 evaluate or activate any listening agents contained in the nodes that correspond to the spatial hierarchy identifier of the reported position. The reported position is associated with node 915. Node 915 and all of the parent nodes of node 915 to the root of the tree are checked for listening agents. The nodes that are checked are nodes 911-915, since these nodes match the corresponding bits at the depth of each node in the spatial hierarchy identifier of the reported position. Node 914 contains a listening agent, and its associated area of influence is used to compute if the actual position of the mobile device is contained. If the mobile device is contained, the listening agent will cause a notification or event to be dispatched.

If load-balancing is not used, but identical listening agents are provisioned to different servers handling the same sections of a spatial hierarchy, then the notifications can go to a central dispatcher, which can filter out duplicate notifications so that only one notification is dispatched.

Figure 13:
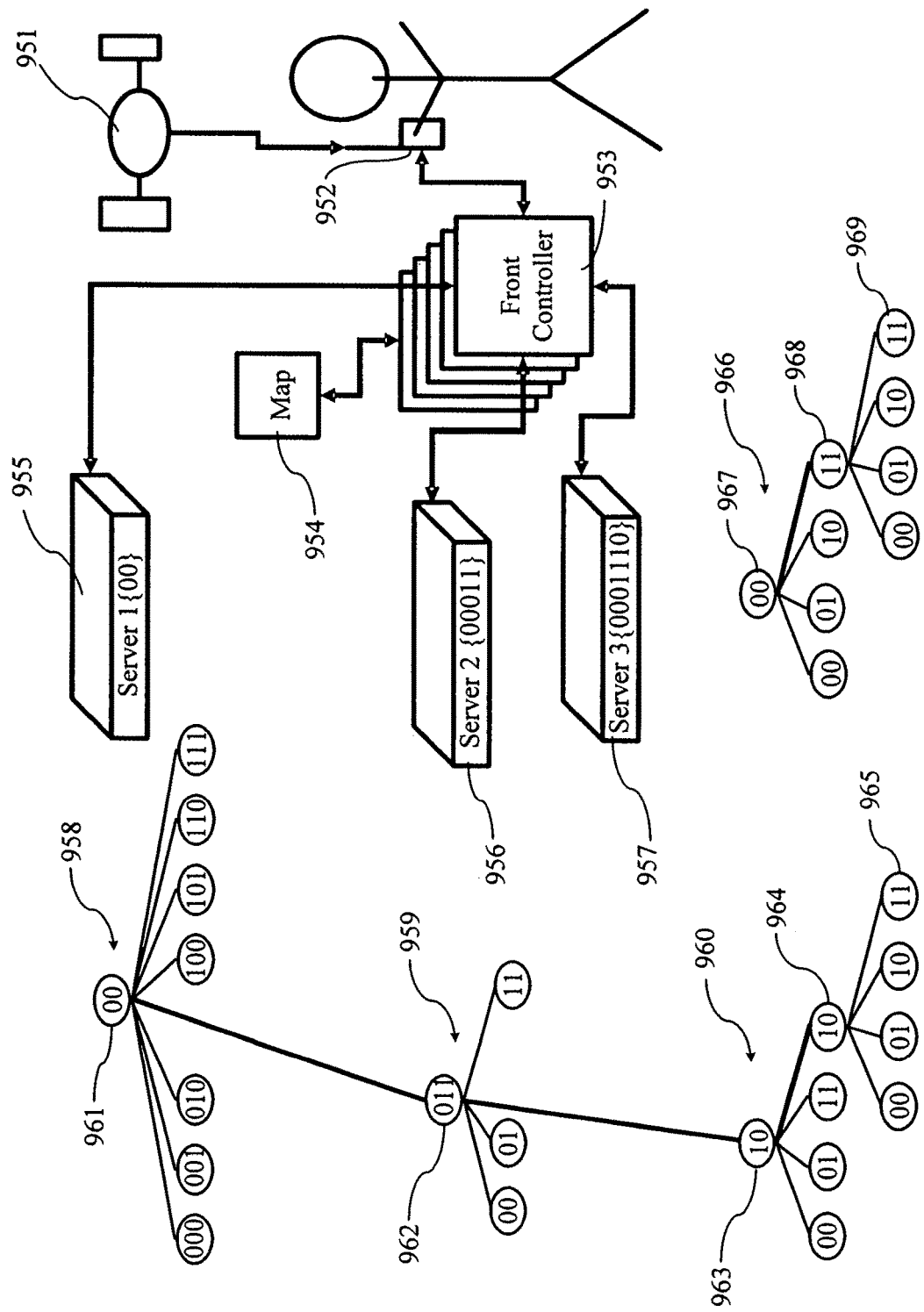
FIG. 13 shows the use of a second spatial hierarchy to stage and disseminate location-based content.

FIG. 13 shows the use of a second spatial hierarchy to stage and disseminate location-based content. Node 964 contains 10,000 objects. Each time a search visits node 964 or any children of node 964, the search must evaluate each object contained in node 964 to determine if an object matches the search criteria. When a node contains a number of objects over a specified threshold, the node may instantiate a data structure associated with a different spatial hierarchy to store its objects. Using the same spatial hierarchy would not be beneficial, since all of the objects would be contained in the same node of the new hierarchy. The different spatial hierarchy must support the independent generation of the spatial hierarchy identifiers to make searching the different spatial hierarchy efficient.

The mobile device 952 receives its position from a positioning system 951. The mobile device generates a set of identifiers that correspond to the required set of identifiers for the front-controller 953. The first identifier corresponds to the first spatial hierarchy. The second identifier in the set corresponds to the second spatial hierarchy. The first spatial hierarchy is used by the front controller 953 and spatial hierarchy map 954 to determine which resources are assigned to which section of the first spatial hierarchy. Data structures 958, 959, and 960 are associated with the first spatial hierarchy. Server 955 contains data structure 958. Server 956 contains data structure 959. Server 957 contains data structure 960. Since node 964 contains too many objects, data structure 966 is created and all of the 10,000 objects contained in node 964 are inserted into data structure 966 using the second spatial identifier associated with each object. Server 957 contains the new data structure 966, which is connected to node 964.

Each object is associated with a set of spatial hierarchy identifiers that correspond to a set of different spatial hierarchies. The spatial hierarchies are different in that their subdivided regions have different boundaries. Node 964 no longer holds the 10,000 objects, although there may be situations where some data would still be maintained in node 964. A search that visits node 964 would cause node 964 to search data structure 966 using the second spatial hierarchy identifier associated with the search. If the second spatial hierarchy better distributes the 10,000 objects across the data structure, then searching the data structure will be much faster than evaluating all 10,000 objects. The instance of the data structure 966 associated with node 964 would only contain data that in the first spatial hierarchy would be stored in node 964. Many instances of the data structure 966 may be created and associated with different nodes in the data structure associated with the first spatial hierarchy. Any node in the data structure 966 that contains too many objects may also create an instance of a data structure associated with a third spatial hierarchy. Any number of spatial hierarchies can be used, although using too many spatial hierarchies will cause degraded performance. Although each spatial hierarchy in the set of spatial hierarchies is global, the instances of the data structure corresponding to the spatial hierarchy only contain the data for the node that instantiated the data structure. Each data structure associated with a second spatial hierarchy created to stage the content for a node associated with a first spatial hierarchy is created with a root node that corresponds to the highest level region of the second spatial hierarchy. Each data structure is sparse in that each structure only contains a node if the node has content or is in the path from the root node to a node that has content.

The nodes that would be searched for a point-in-area search where the first spatial identifier associated with the search point maps to node 965 and the second spatial identifier associated with the search point maps to node 969, would be nodes 965, 964, 963, 962, 961 and nodes 969, 968, and 967. Since the identifiers specify exactly which nodes are associated with regions that contain the point, simple bit calculations can be used to traverse the tree structure instead of expensive computations on bounding geometries to determine which nodes contain the point.

Figure 14:
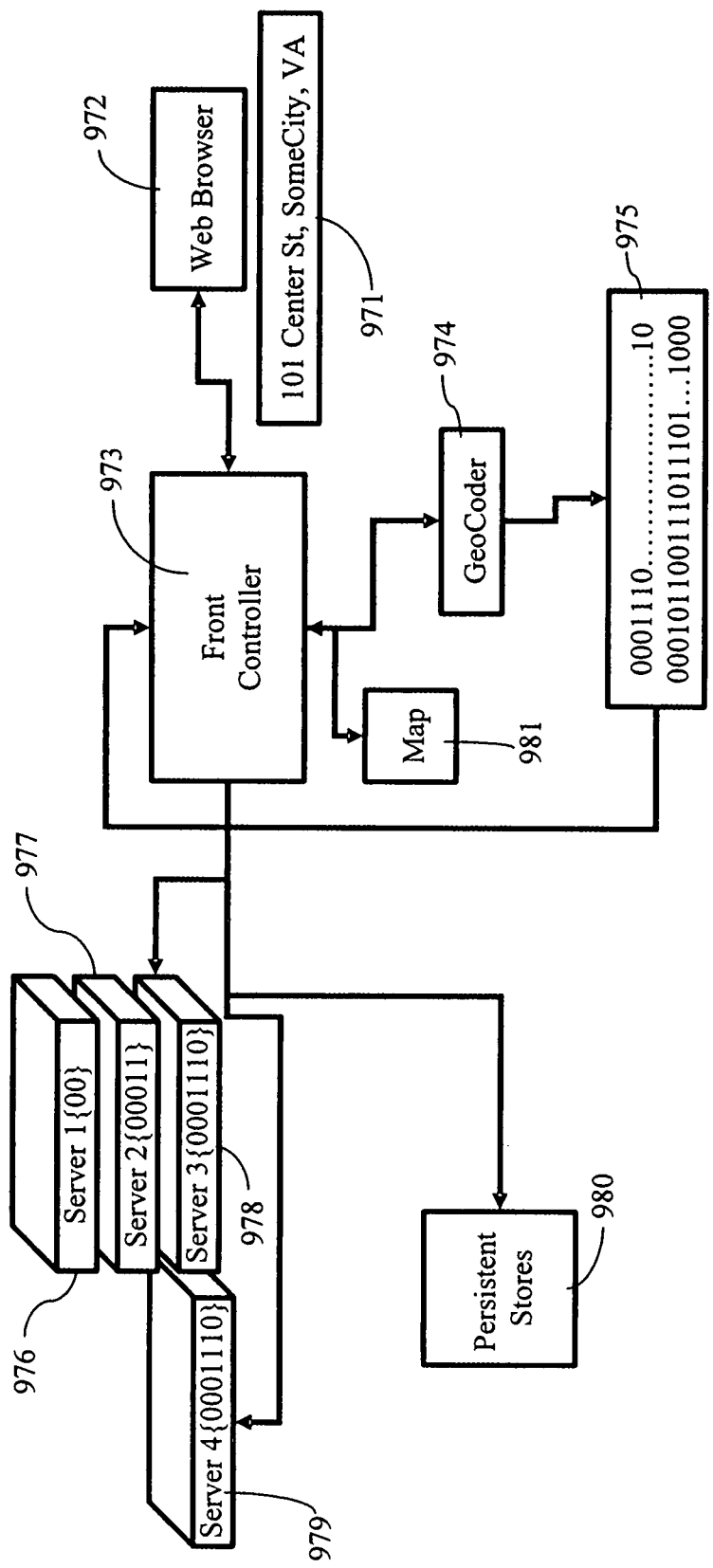
FIG. 14 shows the process of associating a set of spatial hierarchy identifiers with a location.

FIG. 14 shows the process of associating a set of spatial hierarchy identifiers with a location. Address 971 is submitted via a web browser 972 to a web server. The web server contains a front-controller 973 which sends address 971 to a geocoder 974. Geocoder 974 translates the address into a latitude/longitude coordinate. The geocoder 974 generates a set of spatial identifiers 975 corresponding to two or more different spatial hierarchies. The content is associated with the first spatial hierarchy identifier {0001110 . . . 10} and the second spatial hierarchy identifier {000101100111011101 . . . 1000}. The front controller 973 uses the first identifier and the map 981 to determine which servers to publish the content to. The content is published to the staging servers 978 and 979, but not servers 976 and 977. The purpose of publishing the content to the staging servers is to keep them synchronized with the persistent store. The content is also stored, including the associated set of spatial identifiers, in the persistent data store 980. The staging server will load the applicable content from the persistent store that matches its assigned section of the spatial hierarchy each time the staging server is started.

It will be apparent to those skilled in the art that various modifications and variations can be made in the efficient method of location-based content management and delivery of embodiments of the invention without departing from the spirit or scope of the invention. Thus, it is intended that embodiments of the invention cover the modifications and variations of this invention provided they come within the scope of the appended claims and their equivalents.

What is claimed is:

1. A non-transitory, computer readable storage medium comprising a plurality of instructions to manipulate a processor of a mobile computing device, the plurality of instructions causing the processor to perform operations, the operations comprising:
    identifying a position of the mobile computing device relative to a surface using a position indication system,
    associating content with the position,
    generating, within the mobile computing device and independent of a server, a first spatial hierarchy identifier that corresponds to a first spatial hierarchy utilized on the server,
        wherein the first spatial hierarchy identifier identifies first regions within the first spatial hierarchy on the server corresponding to the position,
        wherein the first spatial hierarchy identifier includes a sequence of node identifiers and a depth, wherein the depth indicates a level of subdivision utilized in generating the first spatial hierarchy identifier utilized to identify the first regions corresponding to the position,
        wherein the first spatial hierarchy identifier is generated independent of a data set or data structure,
        wherein the first spatial hierarchy identifier is generated by utilizing a specification that indicates how to regularly subdivide space associated with the position and indicates a geometry of subdivisions subdivided from the space, wherein all space is allocated and there is no overlap between nodes at the same depth;
    generating, within the mobile computing device and independent of the server, a second spatial hierarchy identifier that corresponds to a second spatial hierarchy utilized on the server, wherein the second spatial hierarchy identifier identifies regularly subdivided second regions within the second spatial hierarchy on the server corresponding to the position,
    wherein the first spatial hierarchy is different from the second spatial hierarchy, and wherein the regions of the first and second spatial hierarchies have different boundaries,
    associating the content to at least one of the first or second spatial hierarchy identifiers,
    wherein the content associated to at least one of the first or second spatial hierarchy identifiers completely contains the position-associated content.

2. The non-transitory, computer readable storage medium of claim 1, wherein the computing device is a mobile communication device.

3. The non-transitory, computer readable storage medium of claim 1, wherein the position indication system is a global positioning system.

4. A non-transitory, computer readable storage medium comprising a plurality of instructions to manipulate a processor, the plurality of instructions causing the processor to perform operations, the operations comprising:
    receiving a position from a computer on a network;
    generating, within the computer and independent of a server, a first spatial hierarchy identifier that corresponds to a first spatial hierarchy utilized on the server,
        wherein the first spatial hierarchy identifier identifies first regions within the first spatial hierarchy on the server corresponding to the position,
        wherein the first spatial hierarchy identifier includes a sequence of node identifiers and a depth,
        wherein the depth indicates a level of subdivision utilized in generating the first spatial hierarchy identifier utilized to identify the first regions corresponding to the position;
        wherein the first spatial hierarchy identifier is generated independent of a data set or data structure,
        wherein the first spatial hierarchy identifier is generated by utilizing a specification that indicates how to regularly subdivide space associated with the position and indicates a geometry of subdivisions subdivided from the space, wherein all space is allocated and there is no overlap between nodes at the same depth; and
    generating, within the computer and independent of the server, a second spatial hierarchy identifier that corresponds to a second spatial hierarchy utilized on the server, wherein the second spatial hierarchy identifier identifies regularly subdivided second regions within the second spatial hierarchy on the server corresponding to the position, wherein the first spatial hierarchy is different from the second spatial hierarchy, and
    wherein the regions of the first and second spatial hierarchies have different boundaries.

5. The non-transitory, computer readable storage medium of claim 4, wherein the computer is a mobile communications device.

6. The non-transitory, computer readable storage medium of claim 4, wherein the computer includes a web browser.

7. A non-transitory, computer readable storage medium comprising a plurality of instructions to manipulate a processor, the plurality of instructions causing the processor to perform operations, the operations comprising:
associating content with a position;
generating first regions of a surface;
creating first spatial hierarchy identifiers for each of the first regions that correspond to the position,
wherein the first spatial hierarchy identifiers include sequences of node identifiers and depths,
wherein the depths indicate levels of subdivision utilized in creating the first spatial hierarchy identifiers utilized for the first regions that correspond to the position;
wherein the first spatial hierarchy identifiers are generated independent of a data set or data structure,
wherein the first spatial hierarchy identifiers are generated by utilizing a specification that indicates how to regularly subdivide space associated with the position and indicates a geometry of subdivisions subdivided from the space, wherein all space is allocated and there is no overlap between nodes at the same depth; and
generating regularly subdivided second regions of the surface that are different than the first regions;
creating second spatial hierarchy identifiers for each of the second regions; and
associating the content to the first or second spatial hierarchy identifiers.

8. The non-transitory, computer readable storage medium of claim 7, wherein the content is associated to a spatial hierarchy identifier for a deepest region that completely contains the position associated with location-specific information.

9. A non-transitory, computer readable storage medium comprising a plurality of instructions to manipulate a processor, the plurality of instructions causing the processor to perform operations, the operations comprising:
receiving information;
positioning information within a first data structure corresponding to a first section of a first spatial hierarchy;
instantiating, a second data structure corresponding to a second section of a second spatial hierarchy;
associating the second data structure with a node of the first data structure;
positioning information within the second data structure;
receiving a request associated with a first spatial hierarchy identifier associated with the first section of the first spatial hierarchy and a second spatial hierarchy identifier associated with the second section of the second spatial hierarchy, wherein the first and second spatial hierarchy identifiers each include a sequence of node identifiers and a depth, wherein the depth indicates a level of subdivision utilized in generating the first and second spatial hierarchy identifiers,
wherein the first spatial hierarchy identifier is generated independent of the first and second data structures,
wherein the first spatial hierarchy identifier is generated by utilizing, a specification that indicates how to regularly subdivide space and indicates a geometry of subdivisions subdivided from the space, wherein all space is allocated and there is no overlap between nodes at the same depth;
traversing, after receiving the request, a first data structure corresponding to the first spatial hierarchy identifier; and
traversing a second data structure corresponding to the second spatial hierarchy identifier.

10. The non-transitory, computer readable storage medium of claim 9, further comprising transmitting a response to the requester.

11. The non-transitory, computer readable storage medium of claim 9, wherein the request is associated with a position.

12. The non-transitory, computer readable storage medium of claim 9, wherein the request is associated with two or more different spatial hierarchy identifiers.

13. The non-transitory, computer readable storage medium of claim 9, wherein the traversing the data structure comprises:
finding a node within the first data structure that matches the first spatial hierarchy identifier;
creating nodes within the first data structure specified within the first spatial hierarchy identifier;
finding a node within the second data structure that matches the second spatial hierarchy identifier;
creating, nodes within the second data structure specified within the second spatial hierarchy identifier; and
storing location-specific information in the second data structure at the identified node.

14. The non-transitory, computer readable storage medium of claim 9, wherein the traversing the first data structure further comprises:
visiting all nodes within the first data structure that match a spatial hierarchy identifier; and
comparing information in each of the visited nodes against search criteria.

15. The non-transitory, computer readable storage medium of claim 9, wherein the traversing the second data structure further comprises:
visiting all nodes within the second data structure that match a spatial hierarchy identifier; and
comparing information in each of the visited nodes against search criteria.

16. A computer system comprising:
at least one memory containing at least one program for executing the steps of:
identifying a position using a position indication system;
generating, within the computing system and independent of a server, a first spatial hierarchy identifier that corresponds to a first spatial hierarchy utilized on the server,
wherein the first spatial hierarchy identifier identifies first regions within the first spatial hierarchy on the server corresponding to the position,
wherein the first spatial hierarchy identifier includes a sequence of node identifiers and a depth,
wherein the depth indicates a level of subdivision utilized in generating the first spatial hierarchy identifier utilized to identify the first regions corresponding to the position;
wherein the first spatial hierarchy identifier is generated by utilizing a specification that indicates how to regularly subdivide space associated with the position; and generating, within the computing system and independent of the server, a second spatial hierarchy identifier that corresponds to a second spatial hierarchy utilized on the server, wherein the second spatial hierarchy identifier identifies second regions within the second spatial hierarchy on the server corresponding to the position, wherein the first spatial hierarchy is different from the second spatial hierarchy; and at least one processor for running the program.

17. A computer system comprising:

at least one memory containing at least one program for executing the steps of:

receiving a position from a computer on a network;

generating, within the computer and independent of a server, a first spatial hierarchy identifier that corresponds to a first spatial hierarchy utilized on the server, wherein the first spatial hierarchy identifier identifies first regions within the first spatial hierarchy on the server corresponding to the position, wherein the first spatial hierarchy identifier includes a first sequence of node identifiers and a first depth, wherein the first depth indicates a first level of subdivision utilized in generating the first spatial hierarchy identifier utilized to identify the first regions corresponding to the position;

wherein the first spatial hierarchy identifier is generated independent of a data set or data structure, wherein the first spatial hierarchy identifier is generated by utilizing a specification that indicates how to regularly subdivide space associated with the position; and generating, within the computer and independent of the server, a second spatial hierarchy identifier that corresponds to a second spatial hierarchy utilized on the server, wherein the second spatial hierarchy identifier identifies second regions within the second spatial hierarchy on the server corresponding to the position, wherein the second spatial hierarchy identifier includes a second sequence of node identifiers and a second depth, wherein the second depth indicates a second level of subdivision utilized in generating the second spatial hierarchy identifier utilized to identify the second regions corresponding to the position, wherein the first spatial hierarchy is different from the second spatial hierarchy; and at least one processor for running the program.

18. A computer system comprising:

at least one memory containing at least one program for executing the steps of:

receiving information;

positioning information within a first data structure corresponding to a first section of a first spatial hierarchy;

instantiating a second data structure with a node of the first data structure;

positioning information within the second data structure;

receiving a request associated with a first spatial hierarchy identifier associated with the first section of the first spatial hierarchy and a second spatial hierarchy identifier associated with a second section of a second spatial hierarchy, wherein the first and second spatial hierarchy identifiers each include a sequence of node identifiers and a depth, wherein the depth indicates a level of subdivision utilized in generating the first and second spatial hierarchy identifiers, wherein the first spatial hierarchy identifier is generated independent of the first and second data structures, wherein the first spatial hierarchy identifier is generated by utilizing a specification that indicates how to regularly subdivide space and indicates a geometry of subdivisions subdivided from the space, wherein all space is allocated and there is no overlap between nodes at the same depth;

traversing, after receiving the request, a first data structure corresponding to the first spatial hierarchy identifier;

traversing, after receiving the request, a second data structure corresponding to the second spatial hierarchy identifier; and at least one processor for running the program.

* * * * *